United States Patent
Robertus Van Lier et al.

(10) Patent No.: US 10,379,340 B1
(45) Date of Patent: Aug. 13, 2019

(54) ELECTROWETTING PIXEL WITH MAIN AND INITIATION ELECTRODES AND CONNECTED STORAGE CAPACITORS

(71) Applicant: Amazon Technologies, Inc., Seattle, WA (US)

(72) Inventors: Wilhelmus Johannes Robertus Van Lier, Stevensweert (NL); Toru Sakai, Eindhoven (NL); Abhishek Kumar, Eindhoven (NL); Gor Manukyan, Veldhoven (NL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 129 days.

(21) Appl. No.: 15/717,802

(22) Filed: Sep. 27, 2017

Related U.S. Application Data

(60) Provisional application No. 62/540,885, filed on Aug. 3, 2017.

(51) Int. Cl.
*G09G 3/20* (2006.01)
*G09G 3/34* (2006.01)
(Continued)

(52) U.S. Cl.
CPC ......... *G02B 26/005* (2013.01); *G02B 26/004* (2013.01); *G09G 3/34* (2013.01);
(Continued)

(58) Field of Classification Search
CPC .... G02B 26/00; G02B 26/002; G02B 26/004; G02B 26/005; G02B 26/007; G02B 26/008; G02B 26/02; G02B 26/04; G05D 25/00; G05D 25/02; G02F 1/00; G02F 1/01; G02F 1/0102; G02F 1/0121; G02F 1/03; G02F 1/07; G02F 1/1334; G02F 1/13624; G02F 1/167; G02F 1/1676; G02F 1/1681; G02F 2201/121; G02F 2201/44; G02F 2201/52; G09G 3/34; G09G 3/344; G09G 3/3446; G09G 3/3433; G09G 3/348; G09G 3/38; G09G 5/00; G09G 5/10; G09G 3/2003;
(Continued)

(56) References Cited

U.S. PATENT DOCUMENTS

| 6,727,883 B2 * | 4/2004 | Uno ................. G02F 1/167 204/600 |
| 7,365,732 B2 * | 4/2008 | Matsuda ............ G02F 1/167 345/107 |

(Continued)

*Primary Examiner* — Loha Ben
(74) *Attorney, Agent, or Firm* — Quarles and Brady LLP

(57) ABSTRACT

An electrowetting display device includes a first support plate and a second support plate opposite the first support plate. A plurality of pixel walls are formed over the first support plate. The plurality of pixel walls are associated with a first pixel and a second pixel. The plurality of pixel walls define a first display area of the first pixel and a second display area of the second pixel. A first electrode is formed over the first support plate underneath the first display area of the first pixel. A second electrode is formed over the first support plate underneath the second display area of the second pixel. The first electrode is electrically connected to the second electrode. A first switch may be positioned underneath the second display area, with the first switch being electrically connected to the first electrode.

20 Claims, 9 Drawing Sheets

(51) Int. Cl.
*G09G 3/38* (2006.01)
*G02B 26/00* (2006.01)

(52) U.S. Cl.
CPC .............. *G09G 3/38* (2013.01); *G02B 26/007* (2013.01); *G09G 3/2003* (2013.01); *G09G 3/348* (2013.01); *G09G 2300/0426* (2013.01)

(58) Field of Classification Search
CPC .......... G09G 2300/0426; H01L 27/322; H01L 27/3246; H01L 27/3248; H01L 51/525; H01L 51/5262; G09F 9/00
USPC ....... 359/228, 245, 253, 259, 265, 290, 295, 359/296, 0.315, 316, 320; 345/60, 84, 345/104–107, 204, 206, 690, 901; 349/33, 139, 143, 144
See application file for complete search history.

(56) References Cited

U.S. PATENT DOCUMENTS

| | | | | |
|---|---|---|---|---|
| 8,749,865 | B2* | 6/2014 | Choi | G02B 26/02 359/228 |
| 9,348,132 | B1* | 5/2016 | Novoselov | G02B 26/005 |
| 9,419,242 | B2* | 8/2016 | Baek | H01L 51/525 |
| 9,459,444 | B2* | 10/2016 | Hwang | G02B 26/005 |
| 9,946,107 | B2* | 4/2018 | Sato | G02F 1/1334 |

\* cited by examiner

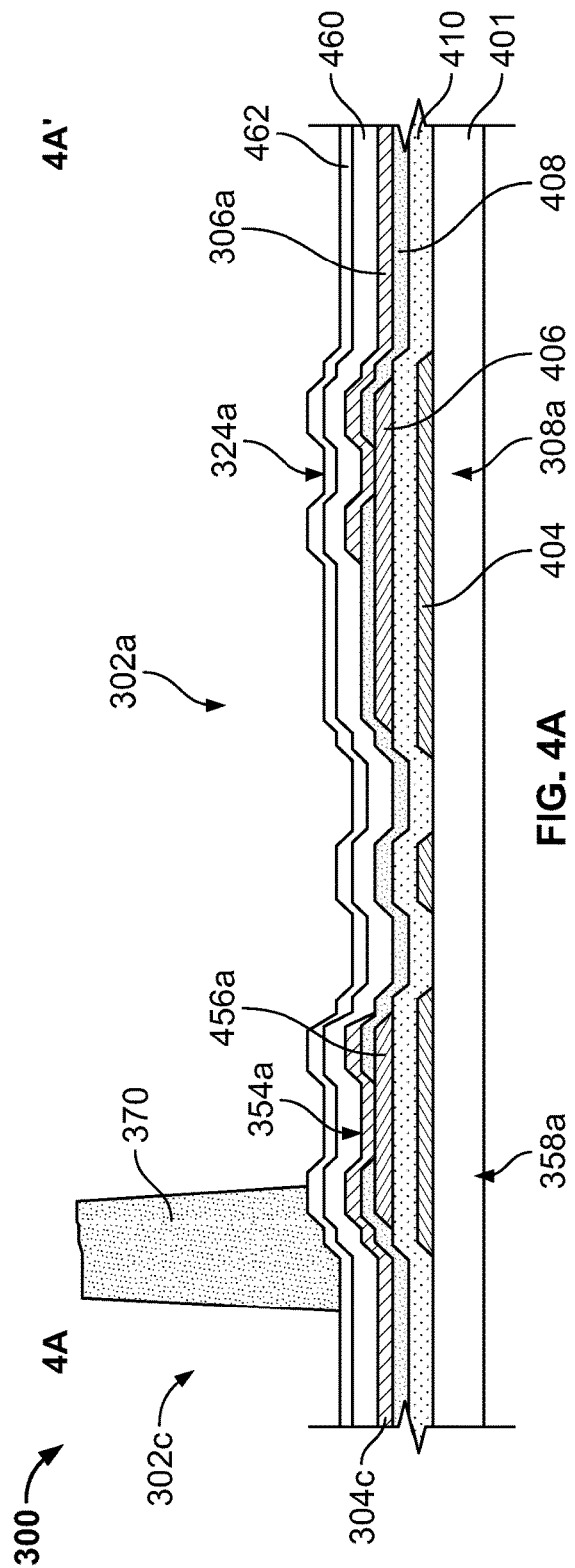

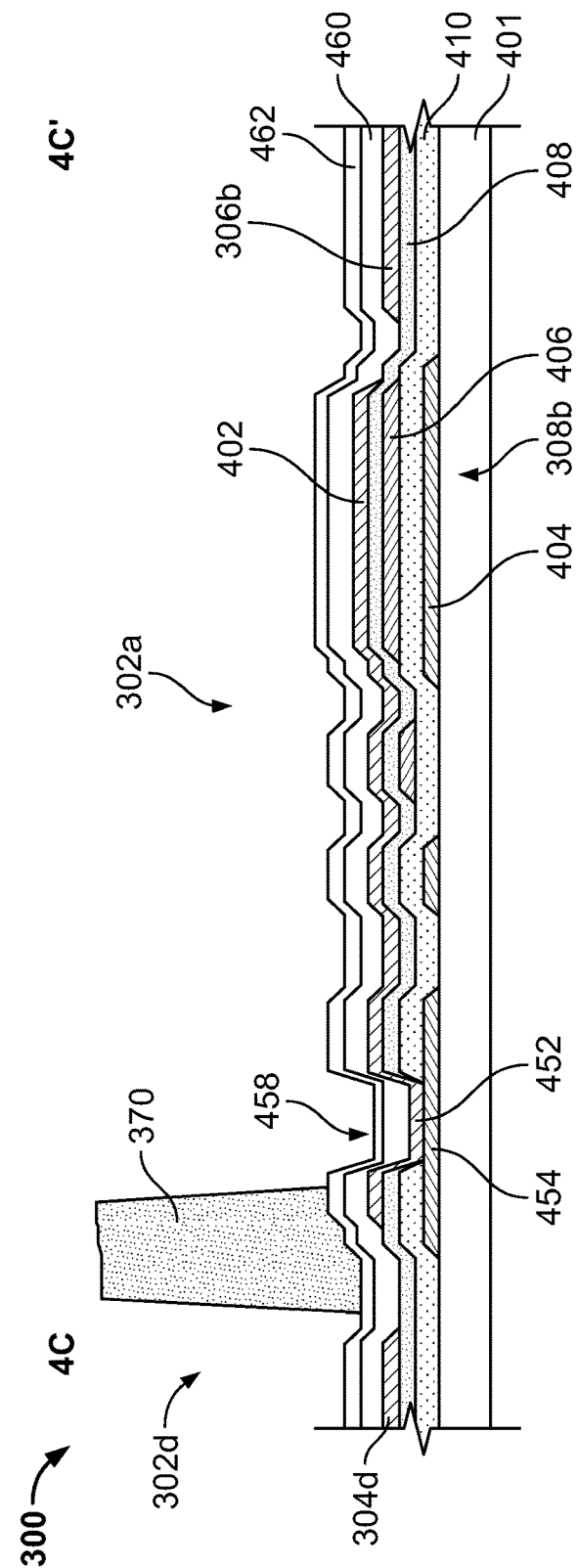

US 10,379,340 B1

ELECTROWETTING PIXEL WITH MAIN AND INITIATION ELECTRODES AND CONNECTED STORAGE CAPACITORS

BACKGROUND

Electronic displays are found in numerous types of electronic devices including, without limitation, electronic book ("eBook") readers, mobile phones, laptop computers, desktop computers, televisions, appliances, automotive electronics, and augmented reality devices. Electronic displays may present various types of information, such as user interfaces, device operational status, digital content items, and the like, depending on the kind and purpose of the associated device. The appearance and quality of a display may affect a user's experience with the electronic device and the content presented thereon. Accordingly, enhancing user experience and satisfaction continues to be a priority. Moreover, increased multimedia use imposes high demands on designing, packaging, and fabricating display devices, as content available for mobile use becomes more extensive and device portability continues to be a high priority to the consumer.

An electrowetting display includes an array of pixels individually bordered by pixel walls that retain fluid, such as an opaque oil, for example. Light transmission through each pixel is adjustable by electronically controlling a position of the fluid in the pixel.

BRIEF DESCRIPTION OF THE DRAWINGS

The detailed description is set forth with reference to the accompanying figures. The use of the same reference numbers in different figures indicates similar or identical items or features.

FIGS. 4A-4C are cross-sectional views of the support plate of the electrowetting display device of FIG. 3.

DETAILED DESCRIPTION

Figure 1A:
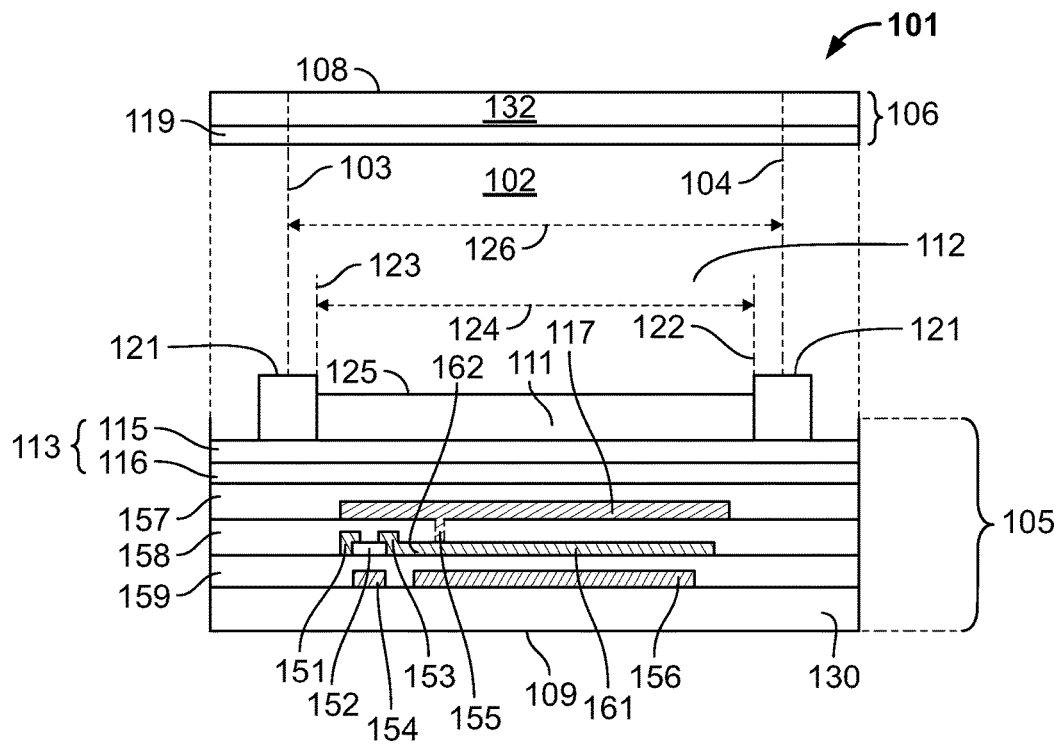
FIGS. 1A and 1B illustrate cross sectional views of a portion of an example electrowetting display device.

In various embodiments described herein, electronic devices include electrowetting displays for presenting content and other information. In some examples, the electronic devices may include one or more components associated with the electrowetting display, such as a touch sensor component layered atop the electrowetting display for detecting touch inputs, a front light or back light component for lighting the electrowetting display, and a cover layer component, which may include antiglare properties, antireflective properties, anti-fingerprint properties, anti-cracking properties, and the like.

An electrowetting display includes a number of electrowetting pixels fabricated over a first or bottom support plate. Each electrowetting pixel is associated with a number of pixel walls. The pixel walls are configured to define a volume containing at least a portion of a first fluid, such as a black opaque oil. Light transmission through the electrowetting pixels can be controlled by an application of an electric potential or driving voltage to the electrowetting pixels, which results in a movement of a second fluid, such as an electrolyte fluid solution, into or within the electrowetting pixels, thereby displacing the oil.

When an electrowetting pixel is in a rest state (i.e., with no driving voltage applied to the pixel or at a driving voltage that falls below a threshold value causing the electrowetting pixel to be inactive), the oil is distributed throughout the pixel. The oil absorbs light and the pixel in this condition appears black or closed. But when the driving voltage is applied, the oil is displaced to one or more sides of the pixel. Light can then enter the electrowetting pixel causing the pixel to appear less dark (e.g., white) to an observer. If the electrowetting display is a reflective display, the bottom of each electrowetting pixel includes a reflective surface. In such a display, light will enter the open pixel, strike the reflective surface at the bottom of the pixel and be reflected out of the pixel. If, however, the electrowetting display is a transmissive display, the bottoms of the pixels are transparent and light entering the open pixels passes through the open pixel and the bottom support plate over which the pixels are formed. If a color filter is incorporated over the pixel, the pixel may appear to have color.

The degree to which the oil is displaced from the oil's resting position affects the pixel's perceived brightness or reflectance. By manipulating the driving voltage applied to the electronic device's electrowetting pixels, different images can be depicted on a display surface of the electronic device.

Typically, an electrowetting pixel's driving voltage is applied to a single pixel electrode formed over or within the bottom surface of the pixel. In a display device with many electrowetting pixels, a timing controller controls the application of driving voltages to the pixel electrodes of the individual electrowetting pixels according to a driving scheme. Such a scheme may call for driving voltages to be applied sequentially to rows of pixels. This can be referred to as addressing rows of pixels. After all rows of electrowetting pixels in the display device have been sequentially addressed and set to appropriate driving voltages, the timing controller returns to addressing the first row of pixels and the process repeats.

The application of a driving voltage to a pixel electrode is controlled by a switch (e.g., a transistor) formed at one side of the electrowetting pixel. When the switch is turned on and the pixel's electrode is set to the driving voltage causing the pixel to open, it is generally desirable that the pixel's oil move in a predictable direction. In some cases, however, the control voltages being applied to the pixel's control switch can interfere with oil movement by attracting the pixel's electrolyte fluid. This can result in unpredictable oil movement, which can, in turn, result in visual artifacts appearing in the display. Some pixel designs also incorporate storage capacitors connected to the pixel's electrode to maintain the desired driving voltage for the time period when the pixel is not actively being addressed. In many configurations, the top plates of such capacitors are set to the desired driving voltage and themselves generate electromagnetic fields that interfere with the movement of oil within the electrowetting pixel.

The present electrowetting pixel design includes two separate pixel electrodes within each electrowetting pixel to enable improved control of oil movement within the pixels. Specifically, the pixels include an initiation pixel electrode that is supplied a driving voltage to initiate movement of oil within the pixel (e.g., when first opening a pixel). In an embodiment, to provide controlled oil movement (particularly when opening a previously-closed pixel), the initiation electrode may initially be set to a maximum driving voltage. After the initiation pixel electrode has been set to the maximum driving voltage, thereby providing that the pixel has at least partially opened and that the pixel's oil has at least partially been displaced in a desired direction, the initiation pixel electrode can be set to the desired driving voltage. The initiation pixel electrode is generally formed at one edge of the pixel and, when the initiation pixel electrode is set to an appropriate driving voltage, electrolyte fluid will enter the pixel over the initiation pixel electrode, causing oil to initially move or break away from the initiation pixel electrode.

Each pixel also includes a main pixel electrode formed over a majority of the bottom surface of the pixels. After the pixel's initiation pixel electrode has caused an initial movement of oil within a pixel, the pixel's main pixel electrode is set to the desired driving voltage, which results in the desired displacement of oil within the pixel, setting pixel's reflectance (or transmittance) value. Using this approach, oil movement within the pixel can be predictable and controlled.

Both the initiation pixel electrode and the main pixel electrode require separate control switches (and, if incorporated into the design, separate storage capacitors) enabling the two electrodes to be set to different voltages at, possibly, different times. If both control witches were incorporated into a single pixel, thereby enabling separate control of the voltages applied to each of that pixel's initiation and main electrodes, the control switches would occupy a significant amount of space within the pixel. This can reduce the area of the pixel that can incorporate reflective structures, which, in turn, can reduce a maximum reflectance of the pixel. In that case of a transmissive display device, the incorporation of two control switches into a single pixel can reduce the area of the pixel allocated for transparent structures. This reduces the efficiency of the display device and may potentially reduce grayscale control of the display device.

In the present design, therefore, pixels are arranged in pairs. Within a pixel pair, the control switch formed within a first pixel of the pair controls the main pixel electrodes of both pixels in the pair. Conversely, the control switch formed within the second pixel of the pair controls initiation pixel electrodes in another pair of pixels. In one specific embodiment, the control switch in the second pixel controls the application of a voltage to the initiation pixel electrodes in a pair of pixels in a preceding row of pixels in the device. This pixel configuration enables the use of pixel designs that incorporate only a single control switch to be used in applying driving voltages to initiation and main pixel electrodes formed within each pixel of a display devices.

This design, therefore, may provide improved control of oil movement within the electrowetting pixels by enabling controlled application of driving voltages through two different pixel electrodes—specifically an initiation pixel electrode and a main pixel electrode. Furthermore, by grouping pixels into pixel pairs, pixel designs that call for pixels including only a single control switch may be utilized to control both the initiation and main pixel electrodes of the electrowetting pixels.

Each pixel may include storage capacitors connected to both the pixel's initiation pixel electrode and main pixel electrode. As described above, the capacitors may be utilized to store a desired driving voltages for each of the pixel's electrode over a time period, such as the addressing period of the display device. The storage capacitors, therefore, can maintain the driving voltages even when the pixel's electrode are not being actively set to the desired driving voltages because other pixels in the display device are being addressed. In an embodiment, the storage capacitors are configured as multiple plate capacitors with multiple conductive plates being separated by two or more electrically insulating or dielectric layers. In such a configuration, the multiple plate capacitors may include a grounded top plate. This may reduce the forces applied to the pixel's electrolyte by the top plate of the storage capacitors which, in turn, can reduce the effect of the charged storage capacitors on movement of oil within the pixel structure.

Hereinafter, example embodiments include, but are not limited to, electrowetting displays that include clear, transparent, or semi-transparent top support plates and bottom support plates. The support plates may comprise glass or any of a number of at least partially transparent materials, such as transparent plastic, quartz, and semiconductors, for example, and claimed subject matter is not limited in this respect. "Top" and "bottom" as used herein to identify the support plates of an electrowetting display do not necessarily refer to a direction referenced to gravity or to a viewing side of the electrowetting display.

A display device, such as an electrowetting display device, may be a transmissive or reflective display device that generally includes an array of pixels configured to be operated by an active matrix addressing scheme. In this disclosure, a pixel may, unless otherwise specified, comprise a single sub-pixel or a pixel that includes two or more sub-pixels of an electrowetting display device. Such a pixel or sub-pixel may be the smallest light transmissive, reflective or transflective element of a display that is individually operable to directly control an amount of light transmission through and/or reflection from the element. For example, in some implementations, a pixel may be a red sub-pixel, a green sub-pixel, a blue sub-pixel or a white sub-pixel of a larger pixel or may, in some cases, include a number of sub-pixels. As such, a pixel may be a pixel that is a smallest component, e.g., the pixel does not include any sub-pixels.

Rows and columns of electrowetting pixels are operated by controlling voltage levels on a plurality of source lines and gate lines. In this fashion, the display device may produce an image by selecting particular pixels to transmit, reflect or block light. Pixels are addressed (e.g., selected and set to a desired driving voltage) via rows and columns of the source lines and the gate lines that are electrically connected to transistors (e.g., used as switches) associated with each pixel. The transistors take up a relatively small fraction of the area of each pixel to allow light to efficiently pass through (or reflect from) the display pixel.

In some embodiments, an electrowetting display comprises an array of pixels sandwiched between a bottom support plate and a top support plate. The pixels may be made up of one or more layers of transparent or opaque materials. Herein, describing a pixel or material as being transparent generally means that the pixel or material may transmit or enable the propagation of a relatively large fraction of the light incident upon it. For example, a transparent material or layer may transmit or propagate more than 70% or 80% of the light impinging on its surface, though claimed subject matter is not limited in this respect. In contrast, opaque generally means that the pixel or material may block or inhibit the transmission or propagation of at least a portion of the visible light spectrum incident upon it. For example, a black opaque material or layer may block, absorb, or otherwise prevent the propagation of more than 70% or 80% of the light impinging on its surface, though claimed subject matter is not limited in this respect. In the present disclosure, materials that are described as preventing the propagation of light shall be understood to prevent propagation of at least 70% of the light striking the material. Alternatively, opaque material may be transmissive for a portion of the visible light spectrum and blocking other portions, forming a color filter. Similarly, materials that are described as being transparent or allowing propagation of light shall be understood to transmit or propagate at least 70% of the light striking the material. In this description, the visible light spectrum may include light having a wavelength between 390 nanometers (nm) and 700 nm.

Pixel walls retain at least a first fluid that is electrically non-conductive in the individual pixels. For example, the first fluid may include an opaque or colored oil. References in the present disclosure to an oil shall be understood to refer to any fluid that is electrically non-conductive. Each pixel includes a cavity or volume formed between the support plates that is at least partially filled with the oil (e.g., retained by pixel walls) and a second fluid (e.g., considered to be an electrolyte solution) that is electrically conductive or polar and may be a water or a salt solution such as a solution of potassium chloride water. The second fluid may be transparent, but may be colored, or light-absorbing in some embodiments. The second fluid is immiscible with the first fluid. Herein, substances are immiscible with one another if the substances do not substantially form a solution.

Individual reflective electrowetting pixels may include a reflective layer on the bottom support plate of the electrowetting pixel, a transparent electrode layer adjacent to the reflective layer, and a hydrophobic layer on the electrode layer. Alternatively, the reflective layer may act as the pixel electrode. Transmissive electrowetting pixels do not include a reflective layer in the stack of layers formed over the bottom support plate and are instead generally transparent. Pixel walls, associated with and formed around each pixel, the hydrophobic layer, and the top support plate at least partially enclose a fluid volume that includes an electrolyte solution and the oil, which is immiscible with the electrolyte solution. An "opaque" fluid, as described herein, is used to describe a fluid that appears black or to have color to an observer. For example, an opaque fluid appears black to an observer when it strongly absorbs a broad spectrum of wavelengths (e.g., including those of red, green and blue light) in the visible region of light or electromagnetic radiation. In some embodiments, the opaque fluid is a non-polar electrowetting oil.

The opaque fluid is disposed in the fluid region. A coverage area of the opaque fluid on the bottom hydrophobic layer is electrically adjustable to affect the amount of light incident on the electrowetting display that reaches the reflective material at the bottom of each reflective pixel or that passes through each transmissive pixel.

In addition to pixels, pixel spacers and edge seals may also be located between the two support plates. Pixel spacers and edge seals that mechanically connect the first support plate with and opposite to the second overlying support plate, or which form a separation between the first support plate and the second support plate, can contribute to the mechanical integrity of the electrowetting display. Edge seals, for example, being disposed along a periphery of an array of electrowetting pixels, may contribute to retaining fluids (e.g., the first and second fluids) between the first support plate and the second support plate. Pixel spacers can be at least partially transparent so as to not hinder throughput of light in the electrowetting display. The transparency of pixel spacers may at least partially depend on the refractive index of the pixel spacer material, which can be similar to or the same as the refractive indices of surrounding media. Pixel spacers may also be chemically inert to surrounding media.

In some embodiments, a display device as described herein may comprise a portion of a system that includes one or more processors and one or more computer memories, which may reside on a control board, for example. Display software may be stored on the one or more memories and may be operable with the one or more processors to modulate light that is received from an outside source (e.g., ambient room light) or out-coupled from a light guide of the display device. For example, display software may include code executable by a processor to modulate optical properties of individual pixels of the electrowetting display based, at least in part, on electronic signals representative of image and/or video data. The code may cause the processor to modulate the optical properties of pixels by controlling electrical signals (e.g., voltages, currents, and fields) on, over, and/or in layers of the electrowetting display.

Figure 1B:
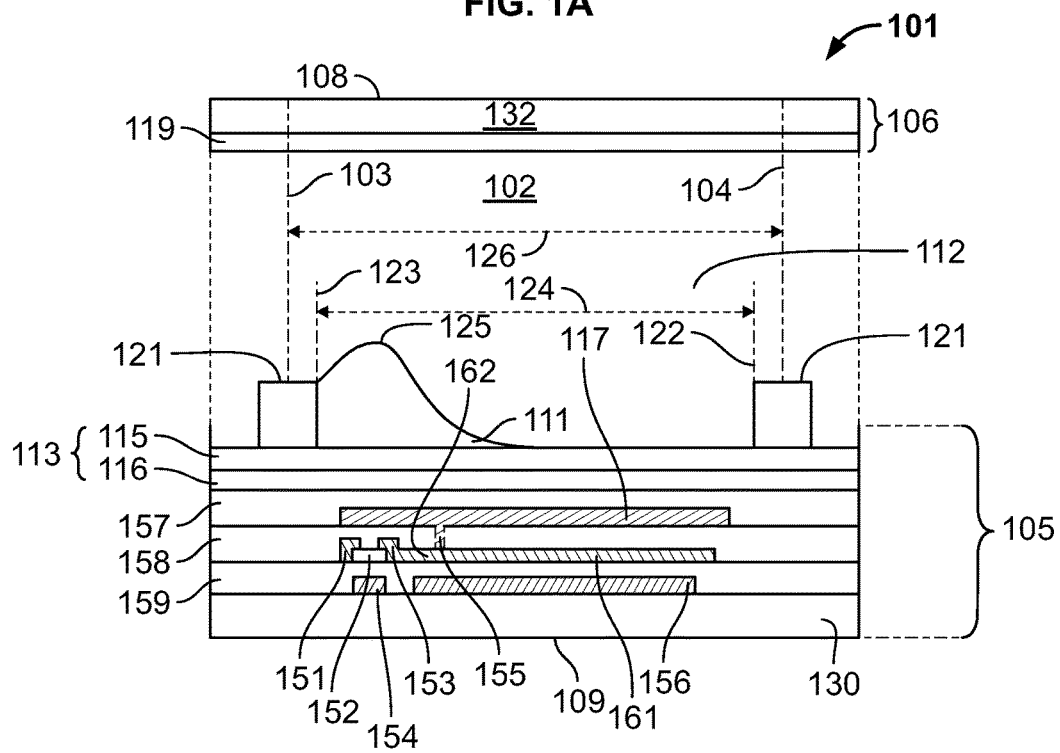

FIGS. 1A and 1B show diagrammatic cross-sectional views of part of an example of an electrowetting display device 101. FIG. 1A shows device 101 in which electrowetting pixel 102 is in a rest or off state (i.e., pixel 102 is closed), while FIG. 1B depicts electrowetting pixel 102 after the application of a driving voltage to pixel 102 so that pixel 102 is at least partially opened. Display device 101 may be of several types, including reflective, transmissive, or transflective types. Display device 101 may be an active matrix driven or a direct drive display device. Display device 101 includes a viewing side 108 upon which an image or display formed by the display device can be viewed as well as a rear side 109.

Electrowetting display device 101, includes a plurality of pixels, such as pixel 102, which may also be referred to as electrowetting display elements, picture elements, or electrowetting elements. In particular, pixel 102 is an example of an electrowetting display element that may produce a display effect. Pixel 102 may be monochrome or color. In some examples of a color display device, the pixels may be divided into groups, each group of pixels being associated with a different color, while in other examples, an individual pixel, such as pixel 102, may be able to produce different colors.

Pixel 102 comprises a first support plate 105 and a second support plate 106. First support plate 105 and second support plate 106 may be separate parts of each pixel, or the support plates may be shared in common by a plurality of pixels. First support plate 105 and second support plate 106 may include a glass or polymer substrate 130 and substrate 132, respectively, and may be rigid or flexible. First support plate 105 and second support plate 106 of pixel 102 may also include further aspects, such as an insulating layer 113 that includes wettable layer 115 and barrier layer 116, pixel walls 121, circuitry for controlling the pixels (e.g., pixel electrode 117 and top electrode 119, signal lines (not shown), and other aspects that are not depicted in FIGS. 1A and 1B for clarity.

In the example pixel 102, the extent of pixel 102 is indicated by the arrow 126 extending between dashed lines 103 and 104, which emanate from the center of pixel walls 121 of pixel 102. Further, in this example, the area of the surface between walls 121, indicated by arrow 124 extending between dashed lines 122 and 123, may be referred to as the display area 124, over which a display effect occurs. In examples, the display area may correspond with the surface area of wettable layer 115 which is bounded by one or more pixel walls 121, and which is adjoined by at least one of the first or second fluids, such as first fluid 111 and second fluid 112.

Pixel 102 includes a volume or space, which may otherwise be considered to be a chamber, between support plates 105 and 106, and which may be filled with a plurality of fluids. In the example of FIGS. 1A and 1B, the space is filled with first fluid 111 and second fluid 112.

First fluid 111 is electrically non-conductive. For example, first fluid 111 may include an alkane, like decane or hexadecane, a silicone oil, or decalin. First fluid 111 may also absorb at least a part of the visible light spectrum. For example, first fluid 111 may be translucent for a part of the visible light spectrum, thereby forming a color filter. In other embodiments, color filtering structures may be formed in pixel 102 to associate pixel 102 with a particular color. For example, color filters (not shown), may be formed over a surface of or within top support plate 106 to filter light passing therethrough.

First fluid 111 may also be colored by addition of pigment particles or a dye. In some examples, first fluid 111 may be black and may absorb substantially all parts of the visible light spectrum. In some examples, first fluid 111 may be reflective. For example, first fluid 111 may reflect the entire visible spectrum, making fluid 111 appear white, or may reflect only part of the visible light spectrum, making fluid 111 appear to have a color. In some examples, first fluid 111 may not absorb all wavelengths within a given spectrum, but may absorb the majority of wavelengths within the given spectrum. Thus, first fluid 111 may be configured to absorb substantially all light incident thereupon. In some examples, first fluid 111 may absorb 90% or more of light in the visible spectrum and incident thereupon.

First fluid 111 may be confined to pixel 102 by pixel walls 121, which follow the cross-section of pixel 102. The cross-section of a pixel may have any shape. When the pixels are arranged in a matrix form, the cross-section of each pixel may usually be square or rectangular. Pixel walls 121 are shown as structures formed or disposed on a surface of and protruding from wettable layer 115. In various examples, forming, disposing, or otherwise arranging an element of an electrowetting pixel may be accomplished through chemical vapor deposition (CVD), or one of its variants, such as plasma-enhanced chemical vapor deposition, or physical vapor deposition (PVD), and other processes known to those of skill in the art. Further, forming or disposing a second structure (e.g. a wall) on a first structure (e.g. a surface) may mean directly on (e.g., in contact with) or indirectly on, such as where there are one or more intervening structures (e.g., layers) and the second structure is above, overlying, or overlapping the first structure aspect through the intervening structures.

Alternatively, pixel walls 121 may instead be part of a surface layer of the support plate that repels the first fluid, such as a hydrophilic or less hydrophobic layer. As illustrated in FIGS. 1A and 1B, pixel walls 121 may extend only partly from first support plate 105 to second support plate 106. However, in other examples, walls 121 may extend fully from first support plate 105 to second support plate 106.

Second fluid 112 is electrically conductive, polar, or both. For example, second fluid 112 may be water, or a salt solution, such as a solution of potassium chloride in water. In some examples, second fluid 112 may be translucent or colored. Examples of colored fluids may also be referred to as selective color absorbing fluids. First fluid 111 is substantially immiscible with second fluid 112 and does not substantially mix second fluid 112. In some examples, first fluid 111 and second fluid 112 do not mix with each other to any degree, while in other examples there may be some degree of mixing of first fluid 111 and second fluid 112. Even in such cases, the degree of mixing may be considered negligible in that the majority of the volume of first fluid 111 is not mixed with the majority of the volume of second fluid 112. The substantial immiscibility of first fluid 111 and second fluid 112 may be due to the properties of each fluids, such as, for example, their chemical compositions.

Due to the immiscibility of first fluid 111 with second fluid 112, first fluid 111 and second fluid 112 tend to remain separated from each other, therefore tending not to mix together to form a homogeneous mixture. Instead, first fluid 111 and second fluid 112 may meet each other at an interface, which may alternatively be referred to as a boundary or a meniscus. The depicted relative thickness of the first fluid 111 layer and the second fluid 112 layer are examples; in other examples, the first fluid 111 layer and the second fluid 112 layer (and potentially other fluid layers) may have different thicknesses.

Interface 125 of FIG. 1A exists when no driving voltage is applied to pixel 102. FIG. 1B depicts an example of an interface 125 that may exist when a driving voltage is applied to pixel 102. Interface 125 indicates a boundary between the volume of first fluid 111 and the volume of second fluid 112. The location and shape of the interface between first fluid 111 and second fluid 112 may be affected by the driving voltage applied to pixel 102 and may cause a display effect.

A display effect for pixel 102 may depend on both the extent that first fluid 111 and second fluid 112 adjoin the surface defined by the display area 124, and the magnitude of a voltage applied to pixel 102. In some examples, first fluid 111 may cover all or the majority of the display area 124 when no voltage is applied to the pixel 102, while in other examples, first fluid 111 may cover less than all or the majority of display area 124 when no voltage is applied to the pixel 102.

When there is no driving voltage being applied to pixel 102, first fluid 111 adheres preferentially to the surface of wettable layer 115 because the surface of wettable layer 115 has a greater wettability for first fluid 111 than for second fluid 112. When, instead, the applied driving voltage is a sufficient, non-zero driving voltage, as in FIG. 1B, the surface of wettable layer 115 has a greater wettability for second fluid 112 than for the first fluid 111. Thus, the driving voltage applied to pixel 102 may cause a display effect by altering the configuration of first fluid 111 and second fluid 112 within pixel 102. For example, line 125 of FIG. 1B depicts an alternative fluid arrangement of pixel 102 when pixel 102 is in an on state. In particular, first fluid 111 has been displaced against a pixel wall 121 by second fluid 112, which is more wettable to wettable layer 115 and thereby attracted to wettable layer 115 during the on state.

First support plate 105 includes insulating layer 113. Insulating layer 113 may be translucent, for example fully transparent or transmissive to visible light. Insulating layer 113 may extend between walls 121 of pixel 102. To avoid short circuits between second fluid 112 and pixel electrode 117 under insulating layer 113, insulating layer 113 may extend uninterrupted over a plurality of pixels.

Insulating layer 113 may include a wettable layer 115. Wettability relates to the relative affinity of a fluid for the surface of a solid. Wettability may be measured by the contact angle between a boundary of the fluid and the surface of the solid. The contact angle is determined by the difference in surface tension between the fluid and the solid at the fluid-solid boundary. For example, a high difference in surface tension can indicate hydrophobic properties. As the skilled person will appreciate, a material may be considered to be hydrophobic if the contact angle with water is greater than 90 degrees; a material may therefore be considered to be hydrophilic if the contact angle with water is less than 90 degrees.

In some examples, a wettable layer may be a hydrophobic layer, for example, formed of a hydrophobic material, such as Teflon AF1600®. In some examples, a hydrophobic layer comprises more than 80%, more than 90%, more than 95%, approximately 100% or 100% of a hydrophobic material by weight or by volume. The remainder of the hydrophobic layer may, for example, be formed of a different material than a hydrophobic material.

Pixel 102 includes pixel electrode 117 as part of the support plate 105. In this example, there is one pixel electrode 117 per pixel. In other examples, there may be more than one pixel electrode as part of support plate 105. Pixel electrode 117 may be of any desired shape or form. In some examples, pixel electrode 117 also acts as a reflective surface, such as in the case of a reflective type pixel. In such examples, pixel electrode 117 may be formed of a reflective and conductive material, such as a metallic material. In some examples, pixel electrode 117 is formed of aluminum. In some examples, pixel electrode 117 is separated from barrier layer 116 by an insulating layer 157. Insulating layer 157 may be a layer comprising a dielectric material, which is a very poor conductor of electric current.

Pixel electrode 117 of pixel 102 is electrically insulated from first fluid 111 and second fluid 112 by insulating layer 113. In some examples, pixel electrodes of neighboring pixels may be separated by a non-conducting layer, while in other examples, pixel electrodes of neighboring pixels may be electrically connected. In some examples, further layers may be arranged between insulating layer 113 and pixel electrode 117.

Second support plate 106 includes electrode 119, which is connected to a second signal line (not shown), and which extends between walls of pixel 102. In some examples, electrode 119 may be disposed or formed, for example located, above and/or covering, overlying, or overlapping the walls of pixel 102 and/or extend uninterruptedly over a plurality of pixels. Alternatively, electrode 119 may be arranged at a border of second support plate 106, where it is in electrical contact with second fluid 112. Electrode 119 is common to all pixels 102 in device 101 and may be used to apply a common voltage to pixel 102. Electrode 119 may therefore operate as a common electrode of device 101. Pixel electrode 117 and electrode 119 may be made of, for example, a translucent conductive material, such as indium tin oxide (ITO).

A switching element is used to control the driving voltage applied to pixel electrode 117, and in-turn for controlling application of a voltage between pixel electrode 117 and top electrode 119 of pixel 102. In this example, the switching element is a transistor such as a thin film transistor (TFT), which is located in or over first support plate 105. The TFT includes a source terminal 151, a drain terminal 153, which is electrically connected to pixel electrode 117, a semiconducting channel 152 connecting source terminal 151 to drain terminal 153, and a gate terminal 154.

In various embodiments, terminals, such as the gate, source and drain terminals, may be electrically conductive structures, such as a node, trace, or other type of connection in an electronic circuit. While the figures depict various example terminals with specific shapes and arrangements, those of skill in the art will appreciate that such terminals may have other shapes and arrangement as the case may be, and may include complex geometries.

One or more of gate terminal 154, source terminal 151, and drain terminal 153 may comprise materials such as molybdenum, aluminum, titanium, copper, or other conductive materials as are known by those of skill in the art, such as other metals and metal alloys. Further, in this example, gate terminal 154 is separated from semiconducting channel 152 by an insulating layer 159, which may comprise a dielectric material thereby electrically insulating gate terminal 154 from semiconducting channel 152. Further, source terminal 151, semiconducting channel 152, and drain terminal 153 may be separated from pixel electrode 117 by an insulating layer 158, which may comprise a dielectric material.

Semiconducting channel 152 is formed from a doped semiconducting material, such as, for example, Silicon (Si), Silicon Germanium (SiGe), Germanium (Ge), Indium Arsenide (InAs), and the like or any combination thereof. The semiconducting channel 152 is doped to be either an n-type or p-type region. During operation, and without any control voltage being applied to gate terminal 154 of the transistor, the semiconducting channel 152 includes a depleted region that does not contain any charge carriers. As such, semiconducting channel 152 operates as an insulator and does not transmit electricity thereby electrically isolating source terminal 151 and drain terminal 153 from one another. In some embodiments, the semiconducting channel 152 of the pixel's transistor may be formed using indium gallium zinc oxide (IGZO) materials or other semiconducting materials.

When, however, a control voltage is applied to gate terminal 154, charge carriers are attracted into the depleted region of semiconducting channel 152. This allows semiconducting channel 152 to conduct electricity, electrically connecting source terminal 151 and drain terminal 153.

In this manner, gate terminal 154 acts as a control terminal the determines whether semiconducting channel 152 is electrically conductive and whether a voltage applied to source terminal 151 will be conducted through semiconducting channel 152 to drain terminal 153 (and, ultimately, to pixel electrode 117).

As described above, in some examples, pixel electrode 117 may be made of a translucent conductive material such as ITO. In examples where pixel electrode 117 is made of a translucent material, there may be a separate layer with a reflective surface, such as a reflector, which may be used to reflect light back out of the pixel (e.g., in the case of reflective or transreflective display types). In other examples, pixel electrode 117 may be made of a reflective conductive material instead, such as a metallic material or a metallic alloy material. In such examples, pixel electrode 117 may act as a reflector in addition to an electrode.

Drain terminal 153 is electrically connected to pixel electrode 117 via contact hole 155, which may be, for example, a via, or other electrical interconnect as are known by persons of skill in the art. Contact hole 155 may be formed through insulating layer 158 by, for example, physical or chemical etching, and other methods as are known by those of skill in the art. Once formed, contact hole 155 may have a conductive material, such as a metallic material, deposited on its inner surface in order to electrically connect drain terminal 153 with pixel electrode 117.

Source terminal 151 may be supplied with a drive voltage by a source signal line (not shown). Gate terminal 154 is supplied with a control voltage by a gate signal line (not shown). As is known to the skilled person, the driving voltage may be applied to pixel electrode 117 by applying a suitable electric potential or control voltage to gate terminal 154, which thereafter changes a state of the semiconducting channel 152 from an electrically non-conducting state to an electrically conducting state. Thus, the transistor may be switched to an electrically conducting state so that the voltage (i.e., the driving voltage) applied to source terminal 151 may be conducted via semiconducting channel 152 to pixel electrode 117 via drain terminal 153. In other words, a flow of electric current between source terminal 151 and drain terminal 153, via semiconducting channel 152, is controllable by application of a control voltage to gate terminal 154.

In examples of active matrix pixels, source terminal 151 may be connected by a source signal line (not shown) to a column driver (not shown) and gate terminal 154 may be connected by a gate signal line (not shown) to a row driver (not shown) in order to control the magnitude of and when an electric potential is applied to pixel electrode 117 thereby further controlling a configuration of first fluid 111 and second fluid 112.

Gate terminal 154 can be formed as a layer of electrically conductive metal on substrate 130 of first support plate 105. Thereafter, an insulating layer 159 comprising a dielectric material, such as silicon nitride or silicon dioxide, is formed on gate terminal 154.

Semiconducting channel 152 is formed as a layer of semiconducting material on insulating layer 159 such that semiconducting channel 152 at least partly overlaps gate terminal 154. In some examples, one or more of drain terminal 153, source terminal 151, and gate terminal 154 may for example be formed from conductive materials, such as molybdenum (Mo), an alloy including molybdenum (Mo) and chromium (Cr), or aluminum (Al).

Pixel electrode 117 is formed on insulating layer 158. Thereafter, insulating layer 157 is formed upon which barrier layer 116 is formed.

After pixel electrode 117 has been subjected to the desired driving voltage by applying an appropriate control voltage to gate terminal 154 rendering semiconducting channel 152 conductive, the control voltage is removed from gate terminal 154 and the driving voltage is no longer applied to pixel electrode 117. In normal circumstances, the driving voltage could quickly dissipate from pixel electrode 117, causing first fluid 111 to relax back to its rest position, effectively rendering pixel 102 into an off state. The driving voltage may dissipate due to current leakage through the pixel's transistor (i.e., TFT leakage). In order to maintain the driving voltage at pixel electrode 117 for a longer amount of time, therefore, pixel 102 incorporates a capacitor structure.

First support plate 105 includes first capacitor plate 156, which forms a storage capacitor with second capacitor plate 161. In some cases, drain terminal 153 and second capacitor plate 161 may be electrically connected, such as at a connection point or a boundary 162, or otherwise drain terminal 153 and second capacitor plate 161 may be integrally formed. First capacitor plate 156 is separated from second capacitor plate 161 by insulating layer 159, which operates as the dielectric material of the capacitor. In this example, the storage capacitor formed by capacitor plates 156 and 161 in combination with insulating layer 159 is connected in parallel with the capacitor formed by pixel electrode 117 and top electrode 119. Consequently, a voltage may be applied between pixel electrode 117 and top electrode 119 for a time duration after switching the transistor off by removing the control voltage from gate terminal 154.

Figure 2:
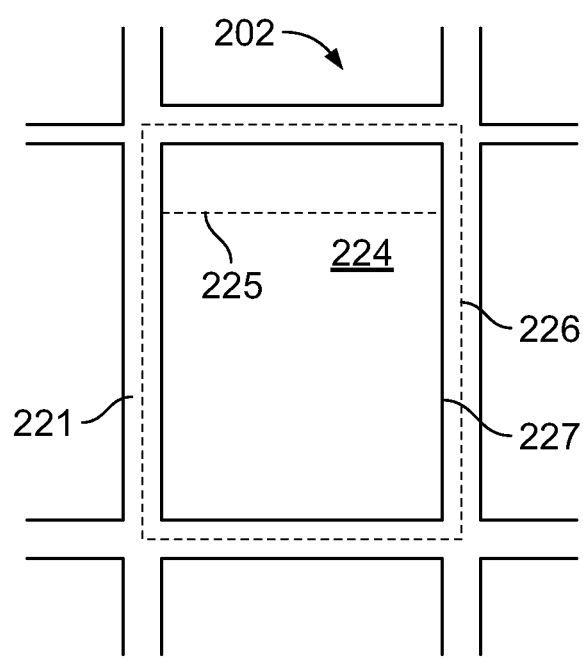
FIG. 2 illustrates a top view of the electrowetting pixels of FIGS. 1A and 1B.

FIG. 2 depicts part of a matrix of rectangular pixels in a top plan view. For example, pixel 202 may be pixel 102 of FIGS. 1A and 1B depicted in a plan view. In the example pixel 202 depicted in FIG. 2, the outer boundary of pixel 202 is indicated by dashed line 226, which corresponds to dashed lines 103 and 104 in FIGS. 1A and 1B. Solid line 227 indicates the inner border of a wall 221 and is also the edge of display area 224 of pixel 202. In this example, display area 224 is a hydrophobic surface of first support plate 105. Note that in other examples, the walls 221 of pixel 202 may be formed into different shapes, for example, not square or rectangular. Further, in other examples, the display area 224 similarly be formed into different shapes, for example, not square or rectangular.

As described above, when a zero or substantially zero voltage is applied between pixel electrode 117 and electrode 119 (shown in FIG. 1A), i.e., when the electrowetting pixel is in an off state, first fluid 111 forms a layer extending between the walls 121. When a non-zero voltage is applied between pixel electrode 117 and electrode 119 (shown in FIG. 1B), i.e., when the electrowetting pixel is in an on state, second fluid 112 will displace first fluid 111 such that first fluid 111 will retract (or contract) against a wall, as shown by the dashed line 225 in FIG. 2 (and 125 in FIG. 1B). Accordingly, the controllable displacement of first fluid 111 in dependence on the magnitude of the applied driving voltage is used to operate the pixel as a light valve and to provide a display effect over display area 224. For example, displacing first fluid 111 to increase adjoinment of second fluid 112 with display area 224 may increase the brightness of the display effect provided by pixel 102. The display state of pixel 102 may therefore go from black to white, or to any intermediate grey state in a black and white display device; or from black to a color of varying brightness in a color display device.

In an electrowetting display device, it is generally preferable that, when a pixel is subjected to a driving voltage, the pixel's oil move in a predictable direction. With reference to FIG. 1B, for example, upon application of a driving voltage to open pixel 102, it is preferable that fluid 111 (i.e., the pixel's oil) move predictably towards the left-hand side of pixel 102 (as depicted in FIG. 1B).

In some cases, however, a number of factors can make the movement of fluid 111 unpredictable upon application of a driving voltage to pixel 102. For example, control voltages applied to the pixel 102's control transistor (e.g., at gate terminal 154 or accumulating at source terminal 151 or drain terminal 153) can attract second fluid 112 causing second fluid 112 to enter pixel 102 over the transistor causing fluid 112 to move to the right (as viewed in FIG. 1B), thereby opposing the desired movement of fluid 111. Similarly, the driving voltage accumulating at the storage capacitor of pixel 102 (and, specifically, at second capacitor plate 161) can interfere with the movement of fluids 111 and 112 within pixel 102.

The present electrowetting pixel design therefore provides two separate pixel electrodes within each electrowetting pixel of a display device to enable improved control of oil movement within the display device's pixels. Specifically, the pixels include an initiation pixel electrode that is supplied a driving voltage to initiate movement of oil within the pixel (e.g., when first opening a pixel). In an embodiment, to provide controlled oil movement (particularly when opening a previously-closed pixel), the initiation electrode may initially be set to a maximum driving voltage. After the initiation pixel electrode has been set to the maximum driving voltage, thereby ensuring that the pixel has at least partially opened and that the pixel's oil has at least partially been displaced in a desired direction, the initiation pixel electrode can be set to the desired driving voltage for the pixel.

Each pixel also includes a main pixel electrode formed over a majority of the bottom surface of the display device's pixels. After an initiation pixel electrode has caused an initial movement of oil within a pixel, that pixel's main pixel electrode is set to an appropriate driving voltage, which results in the desired displacement of oil within the pixel to set that pixel's reflectance (or transmittance, in a transmissive display device). Using this approach, oil movement within the pixel can be predictable and controlled.

Both the initiation pixel electrode and the main pixel electrode require separate control switches (and, if incorporated into the design, separate storage capacitors) enabling the electrodes to be set to different driving voltages at different times. For example, in an initial step, a pixel's initiation pixel electrode may be addressed to a first driving voltage. Then, at a later time, with the pixel now opened, the pixel's main pixel electrode can be set to a desired driving voltage.

In the present design, pixels including single control switches are arranged or grouped in pairs. Within a pixel pair, the control switch formed within a first pixel controls the main pixel electrodes of both pixels in the pair. Conversely, the control switch formed within the second pixel of the pair controls initiation pixel electrodes in another pair of pixels. In one specific embodiment, the control switch in the second pixel controls the application of a voltage to the initiation pixel electrodes in a pair of pixels in a preceding row of pixels in the device. The present pixel configuration enables pixel designs incorporating single control switches to be used in applying driving voltages to multiple electrodes (i.e., initiation and main pixel electrodes) formed within each pixel of the display devices.

In the present design, the top support of the display device, and the structure formed on or over the top support plate may be similar to that of the display device design illustrated in FIGS. 1A and 1B. Specifically, the present device may incorporate a top support plate structure such as support plate 106 that incorporates a common electrode, with the top support plate being mounted over a bottom support plate.

The bottom support plate of the present display device is modified so that the pixels formed thereover include multiple electrodes (i.e., an initiation pixel electrode and a main pixel electrode). Furthermore, the control circuitry, including the control switches (i.e., transistors) and other circuitry of each pixel in the display device is modified to enable separate control of driving voltages being applied to the initiation pixel electrodes and main pixel electrodes of each pixel.

Figure 3:
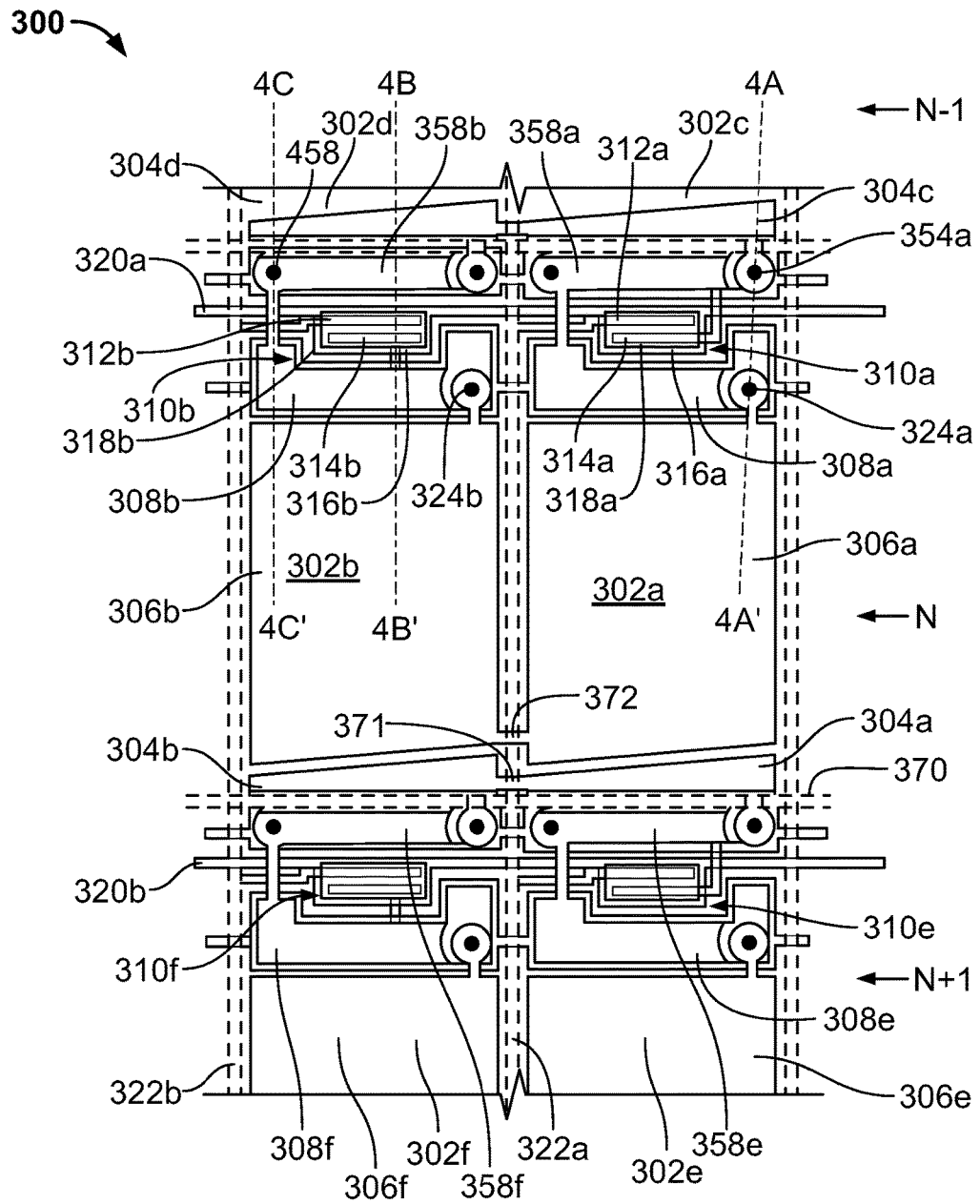
FIG. 3 is a top view of a bottom support plate of an electrowetting display device depicting pixel configurations that include an initiation pixel electrode and a main pixel electrode.
Figure 4B:
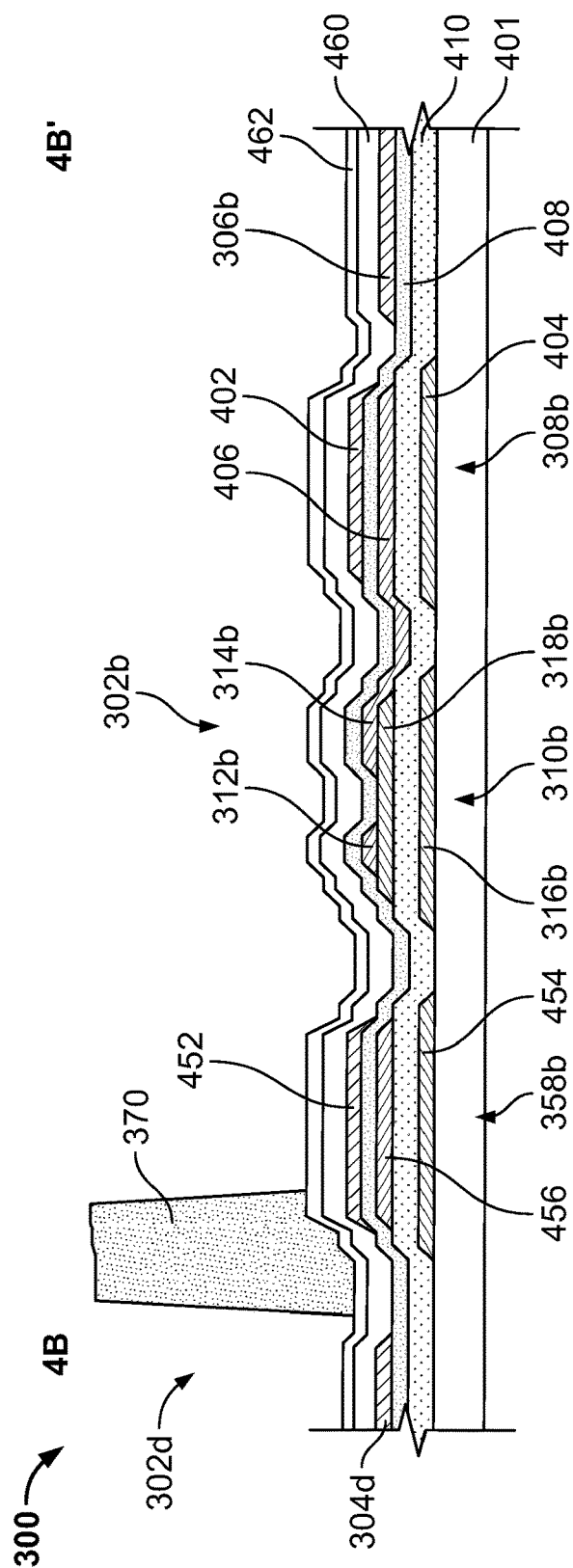

To illustrate the present design, therefore, FIG. 3 is a top view of a bottom support plate 401 of display device 300 over which a number of pixels 302 are formed. FIGS. 4A-4C are cross-sectional views of different portions of display device 300 shown in FIG. 3. Specifically, FIG. 4A is a cross-sectional view of display device 300 taken along line 4A-4A of FIG. 3. FIG. 4B is a cross-sectional view of display device 300 taken along line 4B-4B of FIG. 3. FIG. 4C is a cross-sectional view of display device 300 taken along line 4C-4C of FIG. 3.

The view of display device 300 depicted in FIG. 3 is simplified as not all the layers depicted in the corresponding cross-sectional views are depicted. FIG. 3 is specifically rendered to provide detail of the pixel electrodes of pixels 302, as well as the control circuitry and storage capacitors connected to those pixel electrodes.

Pixels 302 are arranged in a number of rows. Specifically, pixels 302a and 302b below to row N of pixels 302, pixels 302c and 302d below to row N+1 of pixels 302, and pixels 302e and 302f below to row N of pixels 302. According to an addressing scheme for display device pixels 302 belonging to row N−1 will be addressed before pixels 302 in row N. Similarly, pixels 302 belonging to row N will be addressed before pixels 302 in row N+1.

In FIG. 3, each pixel 302 is associated with pixel walls 370 that define a perimeter of each pixel 302. Within a volume at least partially defined by pixel walls 370, fluids, such as an oil and electrolyte solution, may be disposed. The surface of each pixel 302 underlying the volume enclosed by pixel walls 370 associated with a pixel 302 is referred to herein as the display surface or display area of the pixel 302. By applying driving voltage to the pixel electrodes of each pixel 302 as described herein, the oil, that would otherwise cover the display area of pixels 302, may be selectively displaced enabling the display area of the pixel 302 to reflect or transmit light, as described above.

In FIG. 3, pixels 302a-302f are depicted. Pixels 302a and 302b are depicted in their entirety, while only partial views of pixels 302c, 302d, 302e, and 302f are shown. It should be understand that within display device 300 the configuration of all pixels 302 (or at least a majority of pixels 302) may all be similar with pixels 302 share the same structural configuration. As depicted, pixels 302 are arranged in a number of rows and columns.

Within pixels 302, pixels 302a and 302b form a pixel pair. The pixel pair of pixels 302a and 302b is formed adjacent to a second pixel pair that includes pixels 302c and 302d. Only a portion of pixels 302c and 302d are shown in FIG. 3, but the configuration of pixels 302c and 302a are generally the same, and the configuration of pixels 302d and 302b are generally the same. The pixel pair of pixels 302a and 302b are also formed adjacent to a third pixel pair that includes pixels 302e and 302f. Only a portion of pixels 302e and 302f are shown in FIG. 3, but the configuration of pixels 302e and 302a are generally the same, and the configuration of pixels 302f and 302b are generally the same.

A typical device 300 may include a large number of pixel pairs (e.g., potentially thousands of pixel pairs) configured in the manner depicted in FIG. 3 and corresponding FIGS. 4A-4C. In a greyscale display device 300, pixels 302 may each be configured to reflect a particular amount of white light to generate a greyscale image. In a display devices 300 that generates color images, each pixel 302 in each pixel pair may be configured to reflect or transmit a particular color of light.

Each pixel 302 includes an initiation pixel electrode 304 (e.g., initiation pixel electrodes 304a-304d) and a main pixel electrode 306 (e.g., main pixel electrodes 306a-306b and 306e and 306f). In a pixel 302, the initiation pixel electrode 304 and main pixel electrode 306 are each formed underneath a volume that is at least partially defined by the pixel walls 370 associated with the pixel 302. Each of initiation pixel electrodes 304 and main pixel electrodes 306 may be patterned from the same layer of conductive material (e.g., ITO) within device 300 (as depicted in FIGS. 4A-4C), but initiation pixel electrodes 304 are electrically isolated from main pixel electrodes 306. This enables the initiation pixel electrodes 304 and main pixel electrodes 306 within a pixel pair to be set to different driving voltages, as described herein.

Within a pixel pair (e.g., the pixel pair of pixels 302a and 302b), however, the initiation pixel electrodes 304 (i.e., initiation pixel electrodes 304a and 304b) are electrically connected to one another (see, for example, connection 371). Similarly, within a pixel pair, the main pixel electrodes 306 (i.e., main pixel electrodes 306a and 306b) are also electrically connected to one another (see, for example, connection 372). This enables a single voltage source to set both initiation pixel electrodes 304 within a pixel pair to a desired driving voltage. Similarly, a different single voltage source can be used to set both main pixel electrodes 306 within a pixel pair to a desired driving voltage, that may be different from the driving voltage for the pixel pair's initial pixel electrodes 304.

Figure 5A:
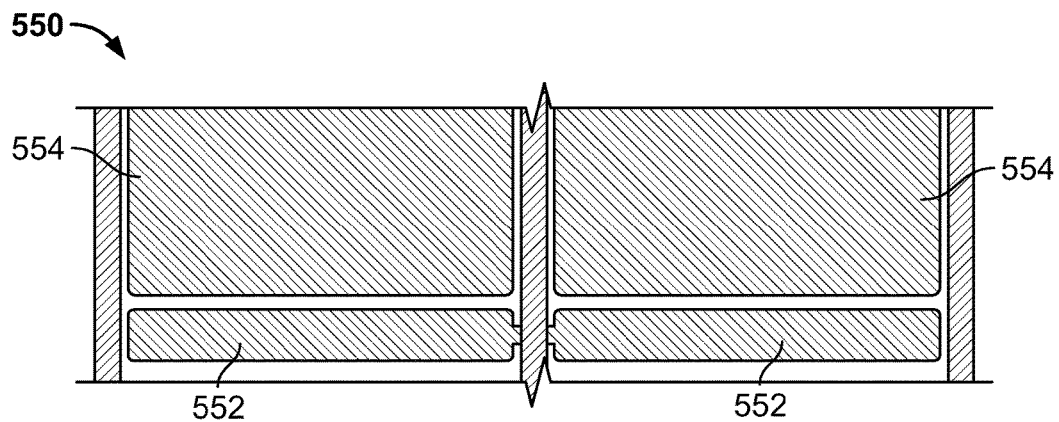
FIGS. 5A and 5B depict pixel pairs including initiation pixel electrodes having alternative shapes.
Figure 5B:
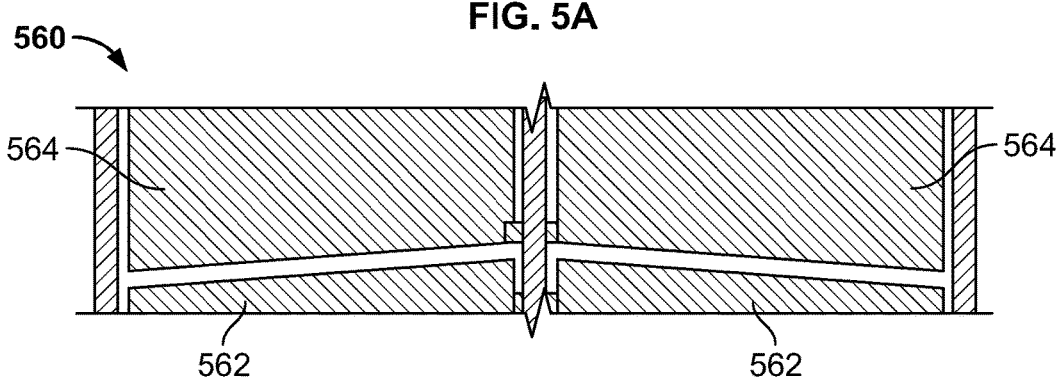

As shown, the initiation pixel electrodes 304 of each pixel 302 are located at or along an edge of pixels 302. Initiation pixel electrodes 304 have a tapered shape in which the width of the initiation pixel electrodes 304 varies across the width of pixels 302. In general, however, any suitable shape for initiation pixel electrodes 304 may be utilized. In some cases, initiation pixel electrodes 304 are rectangular. Within a pixel pair, the initiation pixel electrodes 304 may have the same shape—as in the case depicted in FIG. 3. In other embodiments, however, the initiation pixel electrodes 304 within a pixel pair may have different shapes. For example, the tapered shape of one of initiation pixel electrodes 304 in the pixel pair including pixels 302a and 302b may be reversed so that the initiation pixel electrodes 304 in the pixel pair have opposite or non-symmetrical shapes. To illustrate, FIGS. 5A and 5B depict pixel pairs including initiation pixel electrodes having alternative shapes. In FIG. 5A, each pixel of pixel pair 550 includes initiation pixel electrodes 552 that are generally rectangular in shape. Each pixel includes a main pixel electrode 554 that has an edge closest to initiation pixel electrodes 552 that has a shape generally matching that of initiation pixel electrodes. In FIG. 5B, each pixel of pixel pair 560 includes initiation pixel electrodes 562 that are tapered in shape. As depicted, the shape created by the combination of both initiation pixel electrodes 562 is generally symmetrical about the pixel wall separating the pixels of pixel pair 560. Each pixel of pixel pair 560 includes a main pixel electrode 564 that has an edge closest to initiation pixel electrodes 562 that has a shape generally matching that of initiation pixel electrodes.

As depicted in FIG. 5B, each initiation pixel electrode 562 is wider near a midline of the pixel pair 560 and narrower towards the outer edge of pixel pair 560. As a consequence, in response to a suitable driving voltage being applied to initiation pixel electrodes 562, the oil within each pixel of pixel pair 560 is most likely to break over the wider edge of initiation pixel electrodes 562 (i.e., along the pixel wall separating the pixels of pixel pair 560) with the pixel's electrolyte solution entering each pixel of pixel pair 560 over the wider edge of initiation pixel electrodes 562. Furthermore, this initiation pixel electrode 562 may reduce interference with the operation of and oil movement within nearby pixels because the largest electromagnetic forces generated by initiation pixel electrodes 562 are generated towards the middle of pixel pair 560 at the widest portions of initiation pixel electrodes 562. The narrower portions of initiation pixel electrodes 562, which are disposed towards the outer edge of pixel pair 560 tend to not generate as large electromagnetic fields and, consequently, may not exert as much influence over the oil movement in neighboring pixels.

By applying a suitable driving voltage to a pixel 302's initiation pixel electrode 304, the electrolyte fluid (not shown) of that pixel 302 can be drawn down into the pixel 302 over and towards the initiation pixel electrode 304 causing displacement of the pixel 302's oil away from the pixel 302's initiation pixel electrode 304. With reference to FIG. 3, for example, if a suitable driving voltage is applied to initiation pixel electrode 304a of pixel 302a, electrolyte fluid would be drawn into pixel 302a over initiation pixel electrode 304a, causing the oil in pixel 302a to move away from initiation pixel electrode 304a. Specifically, with reference to FIG. 3, the oil (not shown) that would reside in pixel 302a would move towards the left side of pixel 302a.

By controlling the driving voltage applied to an initiation pixel electrode 304, therefore, the initiation of oil movement within a pixel 302 (e.g., when first opening a pixel 302) can be more precisely controlled. With oil movement initiated, a suitable driving voltage can then be applied to the pixel's main pixel electrode 306 to set the pixel 302 into a desired state with a target reflectance or brightness.

As described above, some driving schemes of display device 300 may call for a driving voltage to be maintained on the main pixel electrodes 306 of pixels 302, even when the driving voltage is not actively being supplied to main pixel electrodes 306. To facilitate the maintenance of a desired driving voltage at main pixel electrodes 306 when main pixel electrodes 306 are not being actively addressed, pixels 302 incorporate capacitors 308 (e.g., capacitors 308a, 308b, 308e, and 308f) coupled to main pixel electrodes 306 (e.g., main pixel electrodes 306a, 306b, 306e, and 306f).

In display device 300, capacitors 308 may be implemented as multiple plate capacitors that include multiple layers of dielectric (i.e., electrically insulating) materials (e.g., silicon nitride) between plates of conductive materials. To illustrate the multiple plate configuration of capacitors 308, reference can be made to FIG. 4B, which depicts a cross-section of device 300 taken through capacitor 308b (the configuration of capacitors 308a, 308e and 308f are generally the same as that of capacitor 308b).

As shown in FIG. 4B, capacitor 308b includes a top capacitor plate 402 (which may be patterned from the same material as main pixel electrode 306b) and a bottom capacitor plate 404, which may be patterned from a separate metal layer within device 300. Capacitor 308b includes a third conductive or metal capacitor plate 406 between top capacitor plate 402 and bottom capacitor plate 404. Capacitor plates 402, 404, and 406 each include a conductive or metal material and are separated from one another by layer of dielectric or insulating material. For example, capacitor plates 402 and 404 are separated by insulating layer 408, which may include a silicon nitride material. Similarly, capacitor plates 404 and 406 are separated from one another by insulating layer 410, which may also include a silicon nitride material.

Insulating layers 408 and 410 make up the dielectric material of capacitor 308b, enabling capacitor 308b to store an electric charge. Specifically, capacitor plates 402 and 404 may both be grounded or connected to a common or ground voltage node, while the voltage being maintained by capacitor 308b accumulates at capacitor plate 406. Capacitor plate 406 is, in turn, connected to main pixel electrode 306a (as shown in FIG. 4A). In some embodiments, bottom capacitor plate 404 may be coupled directly to a ground or reference voltage node. A conductive via may then be formed between top capacitor plate 402 and bottom capacitor plate 404 to electrically connect top capacitor plate 402 to that ground or reference voltage node.

Figure 6:
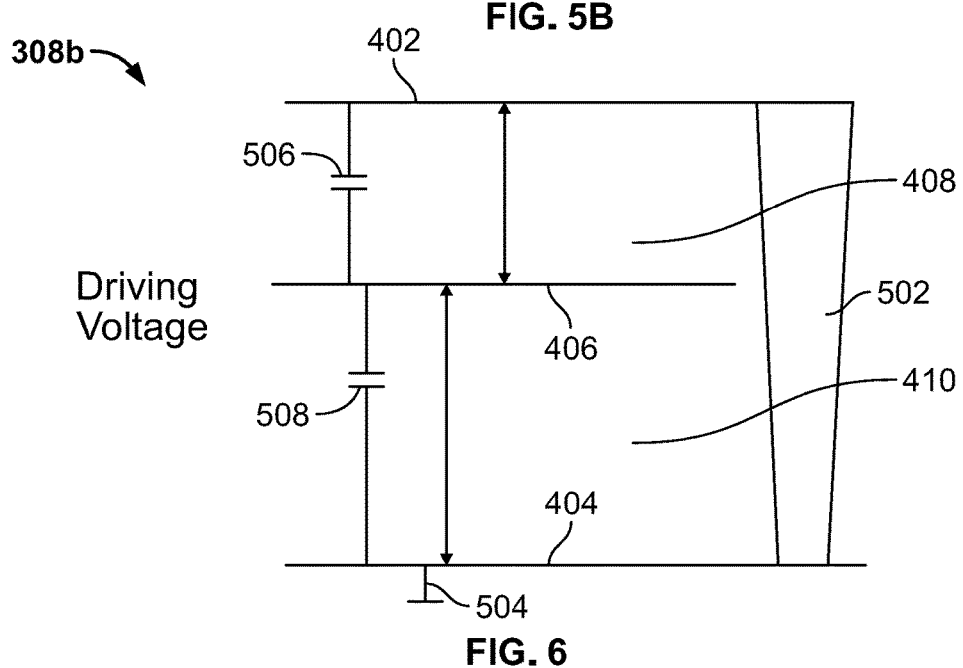
FIG. 6 is a diagram depicting a multiple plate capacitor of the electrowetting display device of FIG. 3.

In this configuration, capacitor 308b may resemble two separate, smaller capacitors connected in parallel. To illustrate, FIG. 6 is a diagram depicting the capacitive structures of capacitor 308b. Specifically, top capacitor plate 402 and capacitor plate 406, in combination with insulating layer 408, form a first capacitor (represented by capacitor symbol 506). Similarly, capacitor plate 406 and capacitor plate 404, in combination with insulating layer 410, form a second capacitor (represented by capacitor symbol 508).

Top capacitor plate 402 and bottom capacitor plate 404 may optionally be connected to a ground or reference voltage node 504 by via 502 that electrically connects top capacitor plate 402 to bottom capacitor plate 404. Capacitor plate 406 is electrically isolated from via 502 (and, thereby, top capacitor plate 402 and bottom capacitor plate 404) by insulating layers 408 and 410. As such, capacitor plate 406 can be set to a desired driving voltage, which will be stored thereon by the capacitive structures 506 and 508. The relative capacities of capacitive structures 506 and 508 can, in some respects, be determined by the distances between the various capacitor plates of capacitor 308b.

Returning to FIG. 3, with the top capacitor plate 402 of capacitor 308b grounded, the likelihood of voltage stored by the top capacitor plate of capacitor 308b interfering with oil or electrolyte fluid movement within pixel 302b may be reduced. This, in turn, can provide improved predictability of fluid movement within pixel 302b.

Pixel 302b includes transistor 310b, which operates as a switch to control the application of a driving voltage to main pixel electrode 306b (and connected main pixel electrode 306a) through capacitor 308b. Transistor 310b is configured similar to transistor 310f. When the driving voltage is applied to main pixel electrodes 306a and 306b, that driving voltage will accumulate within and be stored by capacitors 308a and 308b.

Transistor 310b includes a source terminal 312b, and a drain terminal 314b, which is electrically connected to main pixel electrode 306b through capacitor plate 406 of capacitor 308b. Specifically, drain terminal 314b is connected to capacitor plate 406 of capacitor 308b, as depicted in FIG. 4B. Capacitor plate 406 of capacitor 308b is, in turn, connected to main pixel electrode 306b through via 324b, as shown in FIG. 3. (A similar via 324a connects the central plate of capacitor 308a to main pixel electrode 306b as shown in FIG. 3 and FIG. 4A.) Top capacitor plate 402 of capacitor 308b is etched so that via 324b is electrically isolated from top capacitor plate 402 (which may be set to a ground or reference voltage) and instead only electrically connects capacitor plate 406 to main pixel electrode 306b (and other electrically connected structures including main pixel electrode 306a and storage capacitor 308a). Transistor 310b includes semiconducting channel 318b connecting source terminal 312b to drain terminal 314b, and a gate terminal 316b.

In various embodiments, terminals, such as the gate, source and drain terminals of transistor 310b, may be electrically conductive structures, such as a node, trace, or other type of connection in an electronic circuit. While the figures depict various example terminals with specific shapes and arrangements, those of skill in the art will appreciate that such terminals may have other shapes and arrangement as the case may be, and may include complex geometries.

One or more of gate terminal 316b, source terminal 312b, and drain terminal 314b may comprise materials such as molybdenum, aluminum, titanium, copper, or other conductive materials as are known by those of skill in the art, such as other metals and metal alloys. Further, in this example, gate terminal 316b is separated from semiconducting channel 318b by insulating layer 410, which may comprise a dielectric material thereby electrically insulating gate terminal 316b from semiconducting channel 318b.

Semiconducting channel 318b is formed from a doped semiconducting material. Semiconducting channel 318b is doped to be either an n-type or p-type region. During operation, and without any control voltage being applied to gate terminal 316b of transistor 310b by gate control line 320, the semiconducting channel 318b includes a depleted region that does not contain any charge carriers. As such, semiconducting channel 318b operates as an insulator and does not transmit electricity thereby electrically isolating source terminal 312b and drain terminal 314b from one another.

When, however, an appropriate control signal or control voltage is applied to gate terminal 316b, charge carriers are attracted into the depleted region of semiconducting channel 318b. This allows semiconducting channel 318b to conduct electricity, electrically connecting source terminal 312b and drain terminal 314b.

In this manner, gate terminal 316b acts as a control terminal that determines whether semiconducting channel 318b is electrically conductive and whether a driving voltage applied to source terminal 312b by connected source control line 322b will be conducted through semiconducting channel 318b to drain terminal 314b of transistor 310b (and, ultimately, to main pixel electrodes 306a and 306b).

In this manner, through the application of a suitable control signal at gate control line 320a (i.e., to turn on transistor 310b) and a driving voltage at source control line 322b, the single transistor 310b of pixel 302b can be used to control the application of a driving voltage to both main pixel electrodes 306a and 306b of pixels 302a and 302b, respectively, as well as the storage of that driving voltage at capacitors 308a and 308b.

In a similar manner to main pixel electrodes 306, some driving schemes of display device 300 may call for a driving voltage to be maintained on the initiation pixel electrodes 304 of pixels 302, even when the driving voltage is not actively being supplied to initiation pixel electrodes 304. To facilitate the maintenance of desired driving voltage at initiation pixel electrodes 304 when initiation pixel electrodes 304 are not being actively addressed, pixels 302 incorporate capacitors 358 (e.g., capacitors 358a, 358b, 358e, and 358f) coupled to initiation pixel electrodes 306. Specifically, capacitor 358a of pixel 302a is connected to initiation pixel electrode 304c of adjacent neighboring pixel 302c. Similarly capacitor 358b of pixel 302b is connected to initiation pixel electrode 304d, capacitor 358e of pixel 302e is connected to initiation pixel electrode 304a, and capacitor 358f of pixel 302f is connected to initiation pixel electrode 304b. As such, capacitors 358 are configured to store the driving voltage for the initiation pixel electrodes 304 of neighboring pixels 302. In FIG. 3, only the top plates of each capacitor 358 are illustrated.

In display device 300, capacitors 358 may be implemented as multiple plate capacitors that include multiple layers of insulating materials (e.g., silicon nitride) layers between plates of conductive materials. To illustrate the multiple plate configuration of capacitors 358, reference can be made to FIG. 4B, which depicts a cross-section of capacitor 358b (the configuration of other capacitors 358 is generally the same as that of capacitor 358b).

As shown in FIG. 4B, capacitor 358b includes a top capacitor plate 452 and a bottom capacitor plate 454. Capacitor 358b includes a third capacitor plate 456 between top capacitor plate 452 and bottom capacitor plate 454. Capacitor plates 452, 454, and 456 each include conductive material and are separated from one another by layers of dielectric or insulating material. For example, capacitor plates 452 and 454 are separated by insulating layer 408, which may include a silicon nitride material. Similarly capacitor plates 454 and 456 are separated from one another by insulating layer 410, which may also include a silicon nitride material.

Insulating layers 408 and 410 make up the dielectric material of capacitor 358b, enabling capacitor 358b to store an electric charge. Specifically, capacitor plates 452 and 454 may both be grounded, while the charge being stored by capacitor 358b accumulates at capacitor plate 456. In some embodiments, bottom capacitor plate 454 may be coupled directly to a ground or reference voltage node. Then, a via (see, for example, via 458 depicted in FIG. 4C) may be formed between top capacitor plate 452 and bottom capacitor plate 454 to electrically connect top capacitor plate 452 to that ground or reference voltage node.

In this configuration, capacitor 358b may resemble two separate, smaller capacitors connected in parallel in a similar manner to that depicted in FIG. 6. Specifically, top capacitor plate 452 and capacitor plate 456, in combination with insulating layer 408, may form a first capacitor structure. Similarly, capacitor plate 456 and capacitor plate 454, in combination with insulating layer 410, form a second capacitor structure connected in parallel with the first capacitor structure. The relative capacities of the first and second capacitor structures can, in some respects, be determined by the distances between the various capacitor plates of capacitor 358b.

With the top capacitor plate 452 of capacitor 358b grounded, the likelihood of voltage stored by capacitor 358b interfering with fluid movement within pixel 302b may be reduced. This, in turn, can provide improved predictability of fluid movement within pixel 302b.

Pixel 302a includes transistor 310a, which operates as a switch to control the application of a driving voltage to initiation pixel electrode 304c (and connected initiation pixel electrode 304d) through capacitor 358a. When the driving voltage is applied to initiation pixel electrodes 304c and 304d, that driving voltage will accumulate within and be stored by capacitors 358a and 358b. Similarly, transistor 310e operates as a switch to control the application of a driving voltage to initiation pixel electrode 304a (and connected initiation pixel electrode 304bd) through capacitor 358e.

Transistor 310a includes a source terminal 312a, and a drain terminal 314a, which is electrically connected to initiation pixel electrode 304c through a central capacitor plate of capacitor 358a. Specifically, drain terminal 314a is connected to the central capacitor plate 456a of capacitor 358a. Capacitor plate 456a of capacitor 358a is, in turn, connected to initiation pixel electrode 304c through via 354a, as shown in FIG. 3. As illustrated, the top capacitor plate of capacitor 358a (shown in FIG. 3) is patterned so that via 354a is electrically isolated from the top capacitor plate (which may be set to a ground or reference voltage) and instead only electrically connects capacitor plate 456a to initiation pixel electrode 304c (and other electrically connected structures including initiation pixel electrode 304d and storage capacitors 358a and 358b).

Transistor 310a includes a semiconducting channel 318a connecting source terminal 312a to drain terminal 314a, and a gate terminal 316a. In various embodiments, terminals, such as the gate, source and drain terminals of transistor 310a, may be electrically conductive structures, such as a node, trace, or other type of connection in an electronic circuit.

One or more of gate terminal 316a, source terminal 312a, and drain terminal 314a may comprise materials such as molybdenum, aluminum, titanium, copper, or other conductive materials as are known by those of skill in the art, such as other metals and metal alloys. Further, in this example, gate terminal 316a is separated from semiconducting channel 318a by an insulating layer, which may comprise a dielectric material thereby electrically insulating gate terminal 316a from semiconducting channel 318a.

Semiconducting channel 318a of transistor 310a is formed from a doped semiconducting material that is either an n-type or p-type. During operation, and without any control voltage being applied to gate terminal 316a of transistor 310a by gate control line 320a, semiconducting channel 318a includes a depleted region that does not contain any charge carriers. As such, semiconducting channel 318a acts as an insulator and does not transmit electricity thereby electrically isolating source terminal 312a and drain terminal 314a from one another.

When, however, a control voltage is applied to gate terminal 316a, charge carriers are attracted into the depleted region of semiconducting channel 318a of transistor 310a. This allows semiconducting channel 318a to conduct electricity, electrically connecting source terminal 312a and drain terminal 314a.

In this manner, gate terminal 316a acts as a control terminal that determines whether semiconducting channel 318a of transistor 310a is electrically conductive and whether a driving voltage applied to source terminal 312a by connected source control line 322a will be conducted through semiconducting channel 318a to drain terminal 314a (and, ultimately, to initiation pixel electrodes 304c and 304d).

In this manner, through the application of a suitable control signal at gate control line 320a (i.e., to turn on transistor 310a) and source control line 322a (i.e., to supply a suitable driving voltage), the single transistor 310a of pixel 302a can be used to control the application of a driving voltage to both initiation pixel electrodes 304c and 304d of pixels 302c and 302d, respectively, as well as the storage of that driving voltage at capacitors 358a and 358b.

Device 300 includes barrier layer 460 (see FIGS. 4A-4C) over which wettable layer 462 (not shown in FIG. 3) is formed. Pixel walls 370 are formed or disposed on a surface of and protruding from wettable layer 462. In various examples, forming, disposing, or otherwise arranging an element such as pixel walls 370 of an electrowetting pixel may be accomplished through CVD, or one of its variants, such as plasma-enhanced chemical vapor deposition, or PVD, and other processes known to those of skill in the art. Further, forming or disposing a second structure (e.g. a wall) on a first structure (e.g. a surface) may mean directly on (e.g., in contact with) or indirectly on, such as where there are one or more intervening structures (e.g., layers) and the second structure is above, overlying, or overlapping the first structure aspect through the intervening structures.

The various structures of device 300 depicted in FIGS. 3 and 4A-4C are formed over bottom support plate 401 (not shown in FIG. 3). Support plate 401 may include glass or any of a number of at least partially transparent materials, such as transparent plastic, quartz, and semiconductors, for example, and claimed subject matter is not limited in this respect.

In this configuration, device 300 includes a number of pixels 302 that each include a single control transistor 310, but both an initiation pixel electrode 304 and a main pixel electrode 306. In order to enable control of driving voltages to each of the initiation pixel electrode 304 and main pixel electrode 306 in a particular pixel 302, pixels 302 within device 300 are grouped into pixel pairs. Within a pixel pair, the initiation pixel electrodes 304 and main pixel electrodes 306 are electrically connected to one another enabling a single transistor 310 (e.g., control switch) to control the driving voltage applied to either the initiation pixel electrodes 304 or main pixel electrodes 306 of each pixel 302 in the pixel pair. This, therefore, enables the operation of pixels 302 that incorporate multiple electrodes without incorporating multiple transistors into each individual pixel, which could reduce the area within the pixel that can be allocated to providing a reflective surface (in the case of reflective display devices) or transparent structures (in the case of transmissive devices), which may reduce overall device efficiency.

Figure 7:
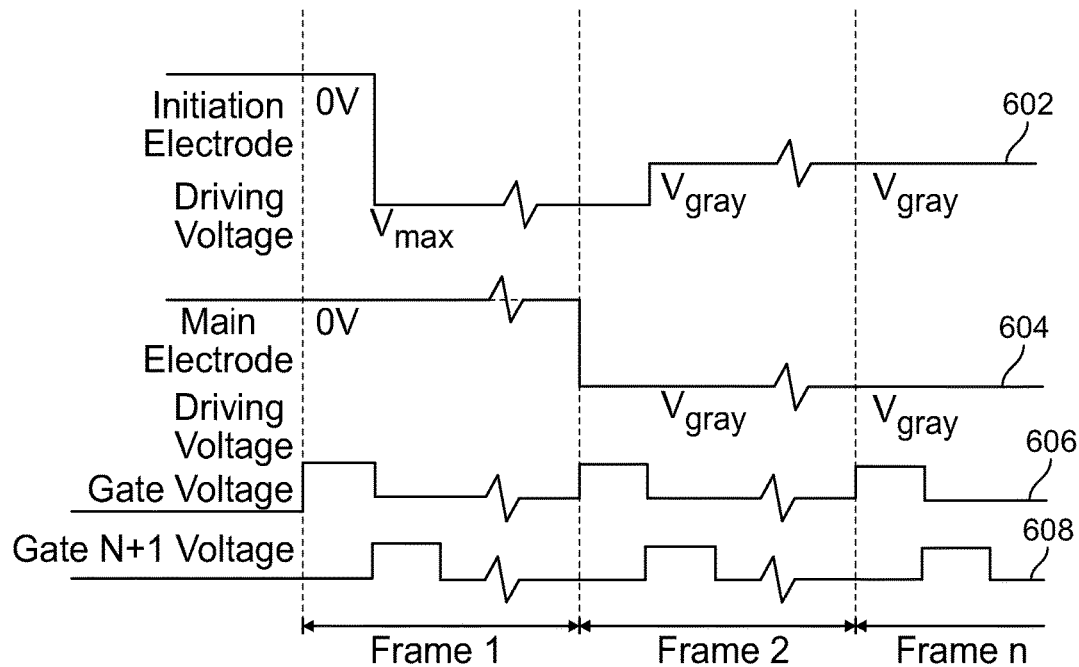
FIG. 7 is a diagram depicting a control signal addressing sequence for a pixel of the display device depicted in FIG. 3.

To illustrate the operation of device 300, FIG. 7 depicts control input signals that may be applied to device 300 when transitioning pixels 302a and 302b from a closed state (in which oil covers the display areas of pixels 302a and 302b) into an open state (in which oil has been displaced from the display areas of pixels 302a and 302b) enabling pixels 302a and 302b to reflect or transmit light.

In FIG. 7, trace 602 represents a driving voltage value for the initiation pixel electrodes 304, while trace 604 represents a driving voltage value for the initiation pixel electrodes 306. Note that in this example, driving voltages are negative values, where a driving voltage of zero volts indicates that the driving voltage is a minimum value. If a main pixel electrode 306 of a pixel is set to the minimum value of zero volts, the pixel 302 would be in a closed state. A negative driving voltage of Vmax indicates a maximum driving voltage. If a pixel 302's main pixel electrode 306 is set to a driving voltage of Vmax, the pixel 302 would be fully opened. Voltages between zero volts and Vmax represent grayscale voltages (e.g., Vgray) at which a pixel 302 may be partially opened.

Trace 606 represents the gate control signal of transistor 310a and 310b in pixels 302a and 302b, respectively. The voltage represented by trace 606 is applied to gate control line 320a. Trace 608 represents the gate control signal of the transistors in the adjacent pixels 302 in the next row of pixels 302 in device 300. In this example, these are pixels 302e and 302f and trace 608 represents the gate control signal applied to gate control line 320b.

The various control signals depicted in FIG. 7, are applied to pixels 302 over a number of frames. Before the first frame, pixels 302a and 302b are closed. As such, in frame 1, a driving voltage is applied to initiation pixel electrodes 304a and 304b to begin opening pixels 302a and 302b.

Accordingly, in frame 1, the initiation electrode driving voltage is set to a maximum value (i.e., Vmax). The initiation electrode driving voltage (represented by trace 602) is applied to source control line 322a. During frame 1, pixels 302a and 302b have not begun to open, so the voltage applied to main pixel electrodes 306a and 306b (represented by trace 604) is a minimum value of zero volts. As such, trace 604, representing the main pixel electrode driving voltage has a minimum value through frame 1. The main electrode driving voltage (represented by trace 604) is applied to source control line 322b.

During frame 1, when the control voltage applied to gate control line 320a increases (switching on both transistors 310a and 310b), as indicated by trace 606, the main pixel electrodes 306a and 306b are set to a minimum voltage, as indicated by trace 602. But, when the control voltage applied to gate control line 320b is increased (switching on both transistors 310e and 310f), as indicated by trace 608, the initiation pixel electrodes 304a and 304b are set to a maximum driving voltage (as indicated by trace 602). This initiates the opening of pixels 302a and 302b. Coincidentally, at this time, main pixel electrodes 306e and 306f of pixels 302e and 302f are set to the minimum driving voltage being applied at source control line 322b.

In frame 2, with both pixels 302a and 302b beginning to open (now that their respective initiation pixel electrodes 304 have been set to an appropriate driving voltage), the main electrode driving voltage can be set to a desired driving voltage for main pixel electrodes 306a and 306b (i.e., Vgray), as depicted by trace 604. Similarly, because pixels 302a and 302b have begun to open, the initiation electrode driving voltage can be set to desired driving voltage Vgray, rather than the maximal driving voltage Vmax, as depicted by trace 604.

During frame 2, therefore, when the control voltage applied to gate control line 320a increases (switching on both transistors 310a and 310b), as indicated by trace 606, the main pixel electrodes 306a and 306b are set to the driving voltage Vgray being applied to source control line 322b, as indicated by trace 602. Similarly, when the control voltage applied to gate control line 320b is increased (switching on both transistors 310e and 310f), as indicated by trace 608, the initiation pixel electrodes 304a and 304b are set to the same driving voltage Vgray being applied to source control line 322a. At this point, pixels 302a and 302b have both been opened and the initiation pixel electrodes 304 and main pixel electrodes 306 are both set to the desired driving voltage of Vgray.

In future frames, the initiation electrode driving voltage (e.g., trace 602) and main electrode driving voltage (e.g., trace 604) can be maintained at the desired driving voltage. As transistors 310b and 310e are alternately turned on according to the drive scheme, initiation pixel electrodes 304a and 304b and main pixel electrodes 306a and 306b will be subjected to the driving voltage Vgray, maintaining pixels 302a and 302b in a constant state of reflectance or transmittance.

The driving scheme illustrated by the control signals of FIG. 7 can be utilized to drive the remaining pixels 302 of device 300 in which the pixels 302 are transitioned from a closed state to an open state by, in a first frame, subjecting initiation pixel electrodes in the pixels to a maximum driving voltage (to open the pixels) and then, in future frame, subjecting both the initiation pixel electrodes and main pixel electrodes in the pixels to a desired driving voltage. Although a direct-current drive scheme has been depicted, it should be understand that alternative drive schemes, such as alternating-current drive schemes may be used to supply appropriate driving voltages to the initiation pixel electrodes 304 and main pixel electrodes 306 of the present device.

Figure 8:
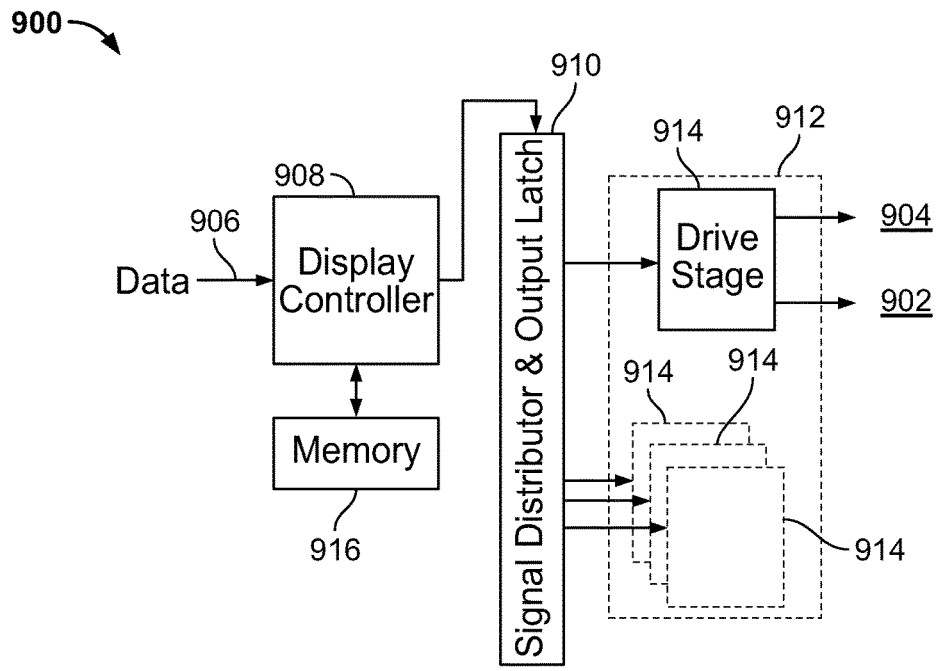
FIG. 8 is a block diagram of an example embodiment of an electrowetting display driving system, including a control system of the electrowetting display device.

FIG. 8 shows a block diagram of an example embodiment of an electrowetting display driving system 900, including a control system of a display device, such as display device 300 of FIGS. 3 and 4A-4C. Display driving system 900 can be of the so-called direct drive type and may be in the form of an integrated circuit adhered or otherwise connected to a support plate of the display device, such as support plate 401. Display driving system 900 includes control logic and switching logic, and is connected to the display by means of signal lines 902 and a common signal line 904. Each electrode signal line 902 connects an output from display driving system 900 to different pixel electrodes within each pixel pair of device 300 (e.g., initiation pixel electrodes 304 or main pixel electrodes 306 of a pixel pair) in the display device, respectively, through a corresponding source terminal of a transistor in each pixel pair. Also included are one or more input data lines 906, whereby display driving system 900 can be provided with data so as to determine a desired display state for the pixels of the device—that is, which pixels should be in an active or open state and which pixels should be in an inactive or closed state at any moment of time. In this manner, display driving system 900 can determine a target reflectance value for each pixel or pair of pixels within the display.

Electrowetting display driving system 900 includes a display controller 908 (e.g., a microcontroller) receiving input data from input data lines 906 relating to the image to be displayed on the device. Display controller 908, being in this embodiment the control system, is configured to apply a display signal (e.g., driving voltage) to the pixel electrodes (e.g., initiation pixel electrodes and/or main pixel electrodes) of the device to establish a particular display state (i.e., reflectance value) for the pixels of the display device.

The output of display controller 908 is connected to the data input of a signal distributor and data output latch 910. Signal distributor and data output latch 910 distributes incoming data over a plurality of outputs connected to the display device, via drivers in certain embodiments. Signal distributor and data output latch 910 cause data input indicating that a certain pixel is to be set in a specific display state to be sent to the output connected to the pixel. Signal distributor and data output latch 910 may be a shift register. The input data is clocked into the shift register and at receipt of a latch pulse the content of the shift register is copied to signal distributor and data output latch 910. Signal distributor and data output latch 910 has one or more outputs, connected to a driver assembly 912. The outputs of signal distributor and data output latch 910 are connected to the inputs of one or more driver stages 914 within electrowetting display driving system 900. The outputs of each driver stage 914 are connected through electrode signal lines 902 and common signal line 904 to a corresponding pixel. In response to the input data, a driver stage 914 will output a voltage of the signal level set by display controller 908 to set one of the pixels to a corresponding display state having a target reflectance level.

To assist in setting a particular pixel to a target reflectance level, memory 916 may also store data that maps a particular driving voltage for a pixel to a corresponding reflectance value and vice versa. The data may be stored as one or more curves depicting the relationship between driving voltage and reflectance value, or a number of discrete data points that map a driving voltage to a reflectance value and vice versa. As such, when display controller 908 identifies a target reflectance value for a particular pixel, display controller 908 can use the data mapping driving voltage to reflectance value to identify a corresponding driving voltage. The pixel can then be driven with that driving voltage.

Figure 9:
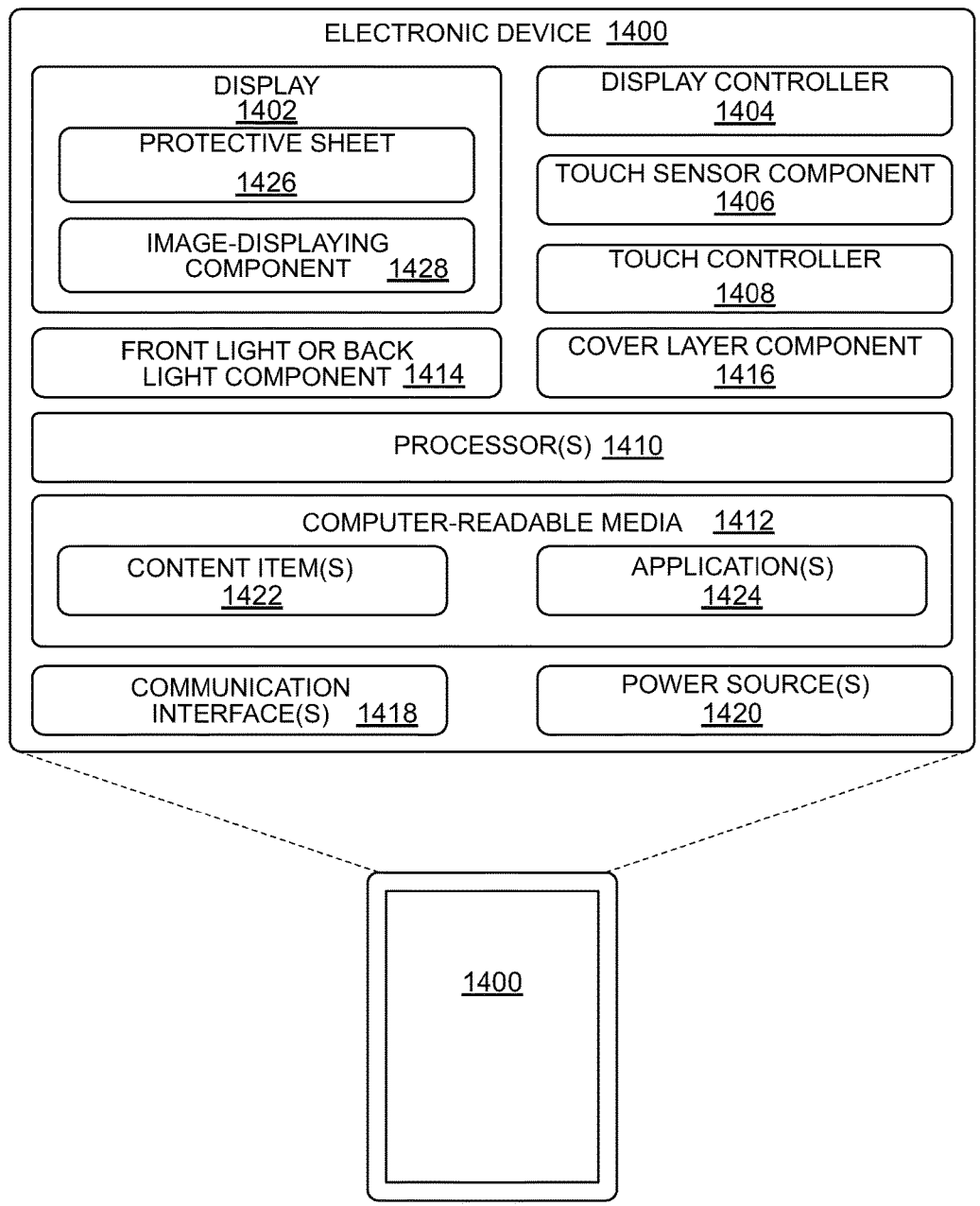
FIG. 9 illustrates an example electronic device that may incorporate a display device, according to various embodiments.

FIG. 9 illustrates an example electronic device 1400 that may incorporate any of the display devices discussed above. Electronic device 1400 may comprise any type of electronic device having a display. For instance, electronic device 1400 may be a mobile electronic device (e.g., an electronic book reader, a tablet computing device, a laptop computer, a smart phone or other multifunction communication device, a portable digital assistant, a wearable computing device, or an automotive display). Alternatively, electronic device 1400 may be a non-mobile electronic device (e.g., a computer display or a television). In addition, while FIG. 9 illustrates several example components of electronic device 1400, it is to be appreciated that electronic device 1400 may also include other conventional components, such as an operating system, system busses, input/output components, and the like. Further, in other embodiments, such as in the case of a television or computer monitor, electronic device 1400 may only include a subset of the components illustrated.

Regardless of the specific implementation of electronic device 1400, electronic device 1400 includes a display 1402 and a corresponding display controller 1404. The display 1402 may represent a reflective or transmissive display in some instances or, alternatively, a transflective display (partially transmissive and partially reflective).

In one embodiment, display 1402 comprises an electrowetting display that employs an applied voltage to change the surface tension of a fluid in relation to a surface. For example, such an electrowetting display may include an array of pixels as described herein, though claimed subject matter is not limited in this respect. By applying a voltage across a portion of an electrowetting pixel of an electrowetting display, wetting properties of a surface may be modified so that the surface becomes increasingly hydrophilic. As one example of an electrowetting display, the modification of the surface tension acts as an optical switch by displacing a colored oil film if a voltage is applied to individual pixels of the display. If the voltage is absent, the colored oil forms a continuous film within a pixel, and the color may thus be visible to a user. On the other hand, if the voltage is applied to the pixel, the colored oil is displaced and the pixel becomes transparent. If multiple pixels of the display are independently activated, display 1402 may present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video or other animated content.

Of course, while several different examples have been given, it is to be appreciated that while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "white" value of the pixel may correspond to a brightest red of the color filter. Furthermore, while some examples herein are described in the environment of a reflective display, in other examples, display 1402 may represent a backlit display, examples of which are mentioned above.

In addition to including display 1402, FIG. 9 illustrates that some examples of electronic device 1400 may include a touch sensor component 1406 and a touch controller 1408. In some instances, at least one touch sensor component 1406 resides with, or is stacked on, display 1402 to form a touch-sensitive display. Thus, display 1402 may be capable of both accepting user touch input and rendering content in response to or corresponding to the touch input. As several examples, touch sensor component 1406 may comprise a capacitive touch sensor, a force sensitive resistance (FSR), an interpolating force sensitive resistance (IFSR) sensor, or any other type of touch sensor. In some instances, touch sensor component 1406 is capable of detecting touches as well as determining an amount of pressure or force of these touches.

FIG. 9 further illustrates that electronic device 1400 may include one or more processors 1410 and one or more computer-readable media 1412, as well as a front light component 1414 (which may alternatively be a backlight component in the case of a backlit display) for lighting display 1402, a cover layer component 1416, such as a cover glass or cover sheet, one or more communication interfaces 1418 and one or more power sources 1420. The communication interfaces 1418 may support both wired and wireless connection to various networks, such as cellular networks, radio, WiFi networks, short range networks (e.g., Bluetooth® technology), and infrared (IR) networks, for example.

Depending on the configuration of electronic device 1400, computer-readable media 1412 (and other computer-readable media described throughout) is an example of computer storage media and may include volatile and nonvolatile memory. Thus, computer-readable media 1412 may include, without limitation, RAM, ROM, EEPROM, flash memory, and/or other memory technology, and/or any other suitable medium that may be used to store computer-readable instructions, programs, applications, media items, and/or data which may be accessed by electronic device 1400.

Computer-readable media 1412 may be used to store any number of functional components that are executable on processor 1410, as well as content items 1422 and applications 1424. Thus, computer-readable media 1412 may include an operating system and a storage database to store one or more content items 1422, such as eBooks, audio books, songs, videos, still images, and the like. Computer-readable media 1412 of electronic device 1400 may also store one or more content presentation applications to render content items on electronic device 1400. These content presentation applications may be implemented as various applications 1424 depending upon content items 1422. For instance, the content presentation application may be an electronic book reader application for rending textual electronic books, an audio player for playing audio books or songs, or a video player for playing video.

In some instances, electronic device 1400 may couple to a cover (not illustrated in FIG. 9) to protect the display 1402 (and other components in the display stack or display assembly) of electronic device 1400. In one example, the cover may include a back flap that covers a back portion of electronic device 1400 and a front flap that covers display 1402 and the other components in the stack. Electronic device 1400 and/or the cover may include a sensor (e.g., a Hall effect sensor) to detect whether the cover is open (i.e., if the front flap is not atop display 1402 and other components). The sensor may send a signal to front light component 1414 if the cover is open and, in response, front light component 1414 may illuminate display 1402. If the cover is closed, meanwhile, front light component 1414 may receive a signal indicating that the cover has closed and, in response, front light component 1414 may turn off.

Furthermore, the amount of light emitted by front light component 1414 may vary. For instance, upon a user opening the cover, the light from the front light may gradually increase to its full illumination. In some instances, electronic device 1400 includes an ambient light sensor (not illustrated in FIG. 9) and the amount of illumination of front light component 1414 may be based at least in part on the amount of ambient light detected by the ambient light sensor. For example, front light component 1414 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of display 1402 may vary depending on whether front light component 1414 is on or off, or based on the amount of light provided by front light component 1414. For instance, electronic device 1400 may implement a larger default font or a greater contrast when the light is off compared to when the light is on. In some embodiments, electronic device 1400 maintains, if the light is on, a contrast ratio for display 1402 that is within a certain defined percentage of the contrast ratio if the light is off.

As described above, touch sensor component 1406 may comprise a capacitive touch sensor that resides atop display 1402. In some examples, touch sensor component 1406 may be formed on or integrated with cover layer component 1416. In other examples, touch sensor component 1406 may be a separate component in the stack of the display assembly. Front light component 1414 may reside atop or below touch sensor component 1406. In some instances, either touch sensor component 1406 or front light component 1414 is coupled to a top surface of a protective sheet 1426 of display 1402. As one example, front light component 1414 may include a lightguide sheet and a light source (not illustrated in FIG. 9). The lightguide sheet may comprise a substrate (e.g., a transparent thermoplastic such as PMMA or other acrylic), a layer of lacquer and multiple grating elements formed in the layer of lacquer that function to propagate light from the light source towards display 1402; thus, illuminating display 1402.

Cover layer component 1416 may include a transparent substrate or sheet having an outer layer that functions to reduce at least one of glare or reflection of ambient light incident on electronic device 1400. In some instances, cover layer component 1416 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3h pencil). Without such scratch resistance, a device may be more easily scratched and a user may perceive the scratches from the light that is dispersed over the top of the reflective display. In some examples, protective sheet 1426 may include a similar UV-cured hard coating on the outer surface. Cover layer component 1416 may couple to another component or to protective sheet 1426 of display 1402. Cover layer component 1416 may, in some instances, also include a UV filter, a UV-absorbing dye, or the like, for protecting components lower in the stack from UV light incident on electronic device 1400. In still other examples, cover layer component 1416 may include a sheet of high-strength glass having an antiglare and/or antireflective coating.

Display 1402 includes protective sheet 1426 overlying an image-displaying component 1428. For example, display 1402 may be preassembled to have protective sheet 1426 as an outer surface on the upper or image-viewing side of display 1402. Accordingly, protective sheet 1426 may be integral with and may overlay image-displaying component 1428. Protective sheet 1426 may be optically transparent to enable a user to view, through protective sheet 1426, an image presented on image-displaying component 1428 of display 1402.

In some examples, protective sheet 1426 may be a transparent polymer film in the range of 25 to 200 micrometers in thickness. As several examples, protective sheet 1426 may be a transparent polyester, such as polyethylene terephthalate (PET) or polyethylene naphthalate (PEN), or other suitable transparent polymer film or sheet, such as a polycarbonate or an acrylic. In some examples, the outer surface of protective sheet 1426 may include a coating, such as the hard coating described above. For instance, the hard coating may be applied to the outer surface of protective sheet 1426 before or after assembly of protective sheet 1426 with image-displaying component 1428 of display 1402. In some examples, the hard coating may include a photoinitiator or other reactive species in its composition, such as for curing the hard coating on protective sheet 1426. Furthermore, in some examples, protective sheet 1426 may be dyed with a UV-light-absorbing dye, or may be treated with other UV-absorbing treatment. For example, protective sheet 1426 may be treated to have a specified UV cutoff such that UV light below a cutoff or threshold wavelength is at least partially absorbed by protective sheet 1426, thereby protecting image-displaying component 1428 from UV light.

According to some embodiments herein, one or more of the components discussed above may be coupled to display 1402 using fluid optically-clear adhesive (LOCA). For example, the lightguide portion of front light component 1414 may be coupled to display 1402 by placing LOCA on the outer or upper surface of protective sheet 1426. If the LOCA reaches the corner(s) and/or at least a portion of the perimeter of protective sheet 1426, UV-curing may be performed on the LOCA at the corners and/or the portion of the perimeter. Thereafter, the remaining LOCA may be UV-cured and front light component 1414 may be coupled to the LOCA. By first curing the corner(s) and/or the perimeter, the techniques effectively create a barrier for the remaining LOCA and also prevent the formation of air gaps in the LOCA layer, thereby increasing the efficacy of front light component 1414. In other embodiments, the LOCA may be placed near a center of protective sheet 1426, and pressed outwards towards a perimeter of the top surface of protective sheet 1426 by placing front light component 1414 on top of the LOCA. The LOCA may then be cured by directing UV light through front light component 1414. As discussed above, and as discussed additionally below, various techniques, such as surface treatment of the protective sheet, may be used to prevent discoloration of the LOCA and/or protective sheet 1426.

While FIG. 9 illustrates a few example components, electronic device 1400 may have additional features or functionality. For example, electronic device 1400 may also include additional data storage devices (removable and/or non-removable) such as, for example, magnetic disks, optical disks, or tape. The additional data storage media, which may reside in a control board, may include volatile and nonvolatile, removable and non-removable media implemented in any method or technology for storage of information, such as computer readable instructions, data structures, program modules, or other data. In addition, some or all of the functionality described as residing within electronic device 1400 may reside remotely from electronic device 1400 in some implementations. In these implementations, electronic device 1400 may utilize communication interfaces 1418 to communicate with and utilize this functionality.

In an embodiment, an electrowetting display device includes a first support plate and a second support plate opposite the first support plate, and a first electrowetting pixel associated with a first plurality of pixel walls over the first support plate. The first plurality of pixel walls defines a first volume containing at least a first portion of an oil and an electrolyte fluid. The electrowetting display device includes a second electrowetting pixel adjacent the first electrowetting pixel. The second electrowetting pixel is associated with a second plurality of pixel walls over the first support plate. The first plurality of pixel walls includes at least one pixel wall that is part of the second plurality of pixel walls. The second plurality of pixel walls defines a second volume containing at least a second portion of the oil and the electrolyte fluid. The electrowetting display device includes a first main pixel electrode over the first support plate underneath a first area defined by the first plurality of pixel walls, and a second main pixel electrode over the first support plate underneath a second area defined by the second plurality of pixel walls. The first main pixel electrode is electrically connected to the second main pixel electrode. The electrowetting display device includes a first transistor underneath the first area defined by the first plurality of pixel walls. The first transistor is electrically connected to the first main pixel electrode and the second main pixel electrode.

In another embodiment, a device includes a first support plate and a second support plate opposite the first support plate, and a plurality of pixel walls over the first support plate. The plurality of pixel walls are associated with a first pixel and a second pixel and define a first display area of the first pixel and a second display area of the second pixel. The device includes a first electrode over the first support plate underneath the first display area of the first pixel, and a second electrode over the first support plate underneath the second display area of the second pixel. The first electrode is electrically connected to the second electrode.

In another embodiment, a device includes a first support plate and a second support plate opposite the first support plate, and a plurality of pixel walls over the first support plate. The plurality of pixel walls are associated with a first pixel and a second pixel. The first pixel has a first display area and the second pixel has a second display area. The device includes a first electrode over the first support plate underneath the first display area and a first switch underneath the second display area. The first switch is electrically connected to the first electrode.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. An electrowetting display device, comprising:
   a first support plate and a second support plate opposite the first support plate;
   a first electrowetting pixel associated with a first plurality of pixel walls over the first support plate, the first plurality of pixel walls defining a first volume containing at least a first portion of an oil and an electrolyte fluid;
   a second electrowetting pixel adjacent the first electrowetting pixel, the second electrowetting pixel being associated with a second plurality of pixel walls over the first support plate, wherein the first plurality of pixel walls includes at least one pixel wall that is part of the second plurality of pixel walls, the second plurality of pixel walls defining a second volume containing at least a second portion of the oil and the electrolyte fluid;
   a first main pixel electrode over the first support plate underneath a first area defined by the first plurality of pixel walls;
   a second main pixel electrode over the first support plate underneath a second area defined by the second plurality of pixel walls, the first main pixel electrode being electrically connected to the second main pixel electrode; and
   a first transistor underneath the first area defined by the first plurality of pixel walls, the first transistor being electrically connected to the first main pixel electrode and the second main pixel electrode.

2. The electrowetting display device of claim 1, further comprising:
   a first initiation pixel electrode over the first support plate between the first main pixel electrode and a first pixel wall in the first plurality of pixel walls, the first initiation pixel electrode being underneath the first area defined by the first plurality of pixel walls; and
   a second initiation pixel electrode over the first support plate between the second main pixel electrode and a second pixel wall in the second plurality of pixel walls, the second initiation pixel electrode being underneath the second area defined by the second plurality of pixel walls, the first initiation pixel electrode being electrically connected to the second initiation pixel electrode.

3. The electrowetting display device of claim 1, further comprising a capacitor over the first support plate between the first main pixel electrode and a second pixel wall in the first plurality of pixel walls, the capacitor being underneath the first area defined by the first plurality of pixel walls, the capacitor including:
   a bottom capacitor plate;
   a first dielectric material over the bottom capacitor plate;
   a metal layer over the first dielectric material, the metal layer being electrically connected to the first main pixel electrode;
   a second dielectric material over the metal layer; and
   a top capacitor plate over the second dielectric material, the top capacitor plate being electrically connected to a ground.

4. The electrowetting display device of claim 1, further comprising:
   a third electrowetting pixel adjacent the second electrowetting pixel and including a third initiation pixel electrode; and
   a second transistor underneath the second area defined by the second plurality of pixel walls, the second transistor being electrically connected to the third initiation pixel electrode.

5. A device, comprising:
   a first support plate and a second support plate opposite the first support plate;
   a plurality of pixel walls over the first support plate, the plurality of pixel walls being associated with a first pixel and a second pixel and defining a first display area of the first pixel and a second display area of the second pixel;
   a first electrode over the first support plate underneath the first display area of the first pixel; and
   a second electrode over the first support plate underneath the second display area of the second pixel, the first electrode being electrically connected to the second electrode.

6. The device of claim 5, further comprising a capacitor underneath the first display area of the first pixel, the capacitor being electrically connected to the first electrode and the second electrode, the capacitor including:
   a bottom capacitor plate;
   a first dielectric material over the bottom capacitor plate;

a metal layer over the first dielectric material, the metal layer being electrically connected to the first electrode and the second electrode;

a second dielectric material over the metal layer; and a top capacitor plate over the second dielectric material.

7. The device of claim 6, wherein the bottom capacitor plate is electrically connected to a ground and the top capacitor plate is electrically connected to the bottom capacitor plate.

8. The device of claim 5, further comprising:

a third electrode over the first support plate underneath the first display area of the first pixel; and a fourth electrode over the first support plate underneath the second display area of the second pixel, the third electrode being electrically connected to the fourth electrode.

9. The device of claim 5, further comprising a first switch associated with the first pixel, the first switch being electrically connected to the first electrode and the second electrode.

10. The device of claim 9, further comprising:

a third pixel adjacent to the second pixel;

a fifth electrode over the first support plate underneath a third display area of the third pixel; and a second switch underneath the second display area of the second pixel, the second switch being electrically connected to the fifth electrode.

11. The device of claim 10, further comprising a second capacitor underneath the first display area of the first pixel, the second capacitor being connected to the fifth electrode.

12. The device of claim 10, wherein the first switch is a first transistor having a first gate terminal and the second switch is a second transistor having a second gate terminal and the first gate terminal is electrically connected to the second gate terminal.

13. A device, comprising:

a first support plate and a second support plate opposite the first support plate;

a plurality of pixel walls over the first support plate, the plurality of pixel walls being associated with a first pixel and a second pixel, the first pixel having a first display area and the second pixel having a second display area;

a first electrode over the first support plate underneath the first display area; and a first switch underneath the second display area, the first switch being electrically connected to the first electrode.

14. The device of claim 13, further comprising a multiple plate capacitor underneath the first display area, the multiple plate capacitor being electrically connected to the first electrode, the multiple plate capacitor including a first dielectric layer and a second dielectric layer.

15. The device of claim 14, wherein the multiple plate capacitor includes a top capacitor plate, and the top capacitor plate is electrically connected to a common voltage node.

16. The device of claim 13, further comprising a second electrode underneath the first display area, the second electrode being electrically isolated from the first electrode.

17. The device of claim 13, further comprising:

a third pixel over the first support plate, the third pixel having a third display area;

a third electrode underneath the third display area; and a second switch underneath the first display area, the second switch being connected to the third electrode.

18. The device of claim 17, wherein the first switch is a first transistor having a first gate terminal and the second switch is a second transistor having a second gate terminal and the first gate terminal is electrically connected to the second gate terminal.

19. The device of claim 18, further comprising a second multiple plate capacitor underneath the first display area, the second multiple plate capacitor being electrically connected to the third electrode.

20. The device of claim 19, wherein the second multiple plate capacitor includes a top capacitor plate, and the top capacitor plate of the second multiple plate capacitor is electrically connected to a second common voltage node.

* * * * *